(12) United States Patent
Momoki et al.

(10) Patent No.: US 7,236,655 B2
(45) Date of Patent: Jun. 26, 2007

(54) POLARIZATION ELEMENT AND OPTICAL DEVICE USING POLARIZATION ELEMENT

(75) Inventors: Kazuhiko Momoki, Saitama-ken (JP); Keiji Ohtaka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 11/433,233

(22) Filed: May 12, 2006

(65) Prior Publication Data

US 2006/0204163 A1 Sep. 14, 2006

Related U.S. Application Data

(62) Division of application No. 11/122,153, filed on May 3, 2005, now Pat. No. 7,155,073.

(30) Foreign Application Priority Data

May 7, 2004 (JP) .............................. 2004-139054
May 19, 2004 (JP) .............................. 2004-149224

(51) Int. Cl.
*G02B 6/00* (2006.01)
(52) U.S. Cl. ........................................ 385/11; 359/483
(58) Field of Classification Search ................. 385/11; 359/483

See application file for complete search history.

(56) References Cited

U.S. PATENT DOCUMENTS

| 5,042,925 A | 8/1991 | Broer et al. |
| 5,481,636 A * | 1/1996 | Fukuda et al. .............. 385/122 |
| 6,384,974 B1 | 5/2002 | Joubert et al. |
| 6,947,215 B2 | 9/2005 | Hoshi |
| 2001/0016247 A1 | 8/2001 | Matsuura et al. |
| 2003/0156325 A1 | 8/2003 | Hoshi |

* cited by examiner

*Primary Examiner*—Jennifer Doan
(74) *Attorney, Agent, or Firm*—Morgan & Finnegan LLP

(57) ABSTRACT

A high performance polarization splitting element and an optical device using the polarization splitting element are provided. According to an embodiment of the present invention, the optical device includes a first periodic structure having a period shorter than a wavelength of used light, a second periodic structure which has a period shorter than the wavelength of the used light and in which a direction of the period is orthogonal to or substantially orthogonal to that of the first periodic structure, and a pair of optical elements disposed so as to sandwich the first periodic structure and the second periodic structure. The second periodic structure is adjacent to the first periodic structure. The first periodic structure and the second periodic structure transmit light having first polarization direction and reflect light having second polarization direction orthogonal to the first direction, and the second polarization direction is substantially parallel to one of the periodic direction of the first periodic structure and the periodic direction of the second periodic structure.

8 Claims, 26 Drawing Sheets

POLARIZATION ELEMENT AND OPTICAL DEVICE USING POLARIZATION ELEMENT

This is a divisional of application Ser. No. 11/122,153, filed May 3, 2005, now U.S. Pat. No. 7,155,073.

BACKGROUND OF THE INVENTION

1. Field of the Invention

The present invention relates to a polarization element, and more particularly to an optical device including the polarization element such as an image pickup optical system, a projection display device (projector), an image processing apparatus, or a semiconductor manufacturing apparatus.

2. Related Background Art

Up to now, a polarization splitting element-using, for example, a dielectric multi-layer film has been known. As shown in FIG. 37, the polarization splitting element allows P-polarized light 18 incident on multi-layer film 17 to transmit through the film at a Brewster's angle as light 19 shown in FIG. 37, and reflects S-polarized light 20 by interference of the multi-layer film as light 21.

The multi-layer film is constructed by stacking dielectric layers having different refractive indices. Assume that a layer having a high refractive index nH is referred to as a layer H and a layer having a refractive index nL lower than the refractive index nH is referred to as a layer L. In general, a Brewster's angle $\theta_B$ between two media having refractive indices $n_1$ and $n_2$ is expressed by the expression (1). Of incident light beams at this angle, a P-polarized light component passes through all the dielectric layers.

$$\tan \theta_B = n_2/n_1 \quad (1)$$

In order to realize the polarization splitting element, it is necessary to establish a relationship between the refractive indices and the angle, in both a prism medium and an interface between the layer H and the layer L. Therefore, it is necessary to satisfy the following relational expression (2) between a refractive index $n_p$ of the prism medium and refractive indices $n_H$ and $n_L$ of two dielectric media composing a thin film.

$$n_P = \sqrt{\frac{n_H^2 n_L^2}{\sin^2 \theta_B (n_H^2 + n_L^2)}} \quad (2)$$

With respect to the S-polarized light, a reflective film by virtue of multi-layer film interference is realized using reflection on the interface due to the refractive index difference between the refractive indices $n_H$ and $n_L$ of a high refractive index medium and a low refractive index medium, respectively. A film thickness of each of the layers is optimized and 20 to 40 layers are stacked. Therefore, it is possible to realize a reflective film that causes reflection over the entire visible light region. With respect to the S-polarized light, a wide-angle characteristic and a wide-wavelength characteristic can be designed by increasing the number of layers of the film. On the other hand, transmittance with respect to the P-polarized light depends on the refractive indices between the media and the incident angle, so that the transmittance does not depend on a change in film thickness. The more the number of layers increases, the more reflectance with respect to the P-polarized light due to a deviation from the Brewster's angle increases. Therefore, wavelength and angle characteristics of the transmittance deteriorate.

A polarization splitting element in which a birefringent adhesive is sandwiched between prisms as described in U.S. Pat. No. 5,042,925 has been known as a polarization splitting element that does not use the multi-layer film. This uses a difference between refractive indices for an ordinary ray and an extraordinary ray of the birefringent material. Although the difference of refractive indices therebetween is small, a large incident angle of about 60° is set to totally reflect one of the polarized light beams in a selective manner, thereby realizing polarization splitting.

When the total reflection is to be caused, it is necessary that the incident angle be equal to or larger than a critical angle $\theta_c$. The critical angle $\theta c$ is expressed by the following expression (3).

$$\sin \theta_C = n_2/n_1 \quad (3)$$

There has been known a polarization splitting element using birefringence in which a multi-layer film is etched to obtain a one-dimensional grating as shown in FIG. 36. The multi-layer film in which layers H 15 such as $TiO_2$ layers and layers L 16 such as $SiO_2$ layers are alternately stacked is etched to obtain the one-dimensional grating. When a period of the grating is made equal to or shorter than a wavelength of used light, the grating exhibits a birefringent characteristic with respect to incident light.

Such a birefringent characteristic caused depending on the structure of matter is called structural birefringence. The polarization splitting element can be realized by combining materials of the multi-layer film, and suitably setting a grating shape. In this specification, a structure having a period shorter than a wavelength λ of the used light, such as the one-dimensional grating, is referred to as a sub-wavelength structure (SWS).

The used light in this specification indicates light having a wavelength range corresponding to an optical element to be used. For example, assume that light beam from a light source which is made incident on an optical element to be used for visible light has a wide wavelength band, more specifically, includes light other than the visible light, such as ultraviolet light or infrared light in addition to the visible light. In this case, the light other than the visible light is also made incident on the optical element. Even in such a state, assume that the used light for the optical element to be used for visible light is visible light. The visible light is light having a wavelength of within a range of about 400 nm to 700 nm.

A refractive index of the SWS grating can be treated as an effective refractive index. In a grating as shown in FIG. 10A, assume that polarized light in a periodic direction of the grating is TM polarized light and polarized light in a direction orthogonal to the periodic direction is TE polarized light. Here, there has been known that effective refractive indices $n_{TE}$ and $n_{TM}$ with respect to the respective polarized lights in a one-dimensional grating in which media having refractive indices, $n_1$ and $n_2$, are repeated at a width ratio of a:b, are generally expressed by the expressions (4) and (5).

$$TE n_{TE} = \sqrt{\frac{an_1^2 + bn_2^2}{a+b}} \quad (4)$$

$$TM n_{TM} = \sqrt{\frac{a+b}{a/n_1^2 + b/n_2^2}} \quad (5)$$

Here, $n_{TE} > n_{TM}$ is satisfied regardless of the ratio of a:b.

In the one-dimensional grating, assume that the medium of n1 is a dielectric and the medium of n2 is air. When a ratio of a dielectric width to a grating pitch is set as a filling factor f, the filling factor f is expressed by the expression (6). In this example, etching is performed such that the filling factor becomes about 0.5.

$$f=a/(a+b) \qquad (6)$$

FIG. 10B is a graph showing a change in effective refractive index relative to the filling factor f of $TiO_2$ in a grating in which the medium of n1 is $TiO_2$ and the medium of n2 is air. Similarly, FIG. 10C is a graph showing a change in effective refractive index in a grating in which the medium of n1 is $SiO_2$. As is apparent from the graphs, a difference between refractive indices of the layer H and the layer L in the TE direction is larger and a difference between refractive indices of the layer H and the layer L in the TM direction is smaller. When a suitable prism medium is used, a Brewster's angle condition is satisfied in the TM direction, with the result that the grating can transmit the P-polarized light. A thickness of each of the layers is independent of the Brewster's angle condition. When a film thickness of each of the layer H and the layer L is optimized, it is possible to form the dielectric multi-layer film. As a result, the dielectric multi-layer film is provided with a function for reflecting the S-polarized light, which means that a function of the polarization splitting element is obtained. This improves the degree of freedom of selection of media satisfying the Brewster's angle condition with respect to the P-polarized light as compared with the case of the polarization splitting element composed of only the dielectric thin film. Therefore, it is possible to simultaneously increase the reflectance for the S-polarized light. Thus, the polarization splitting element covering the entire visible light region can be composed of about 20 layers.

However, in the case of the polarization splitting element using the dielectric multi-layer film, the Brewster's angle condition is used to transmit the P-polarized light. Therefore, the refractive index of a prism glass material and the refractive index of thin film medium are limited by the expression (1), so it is hard to widen an incident angle characteristic. The incident angle characteristic cannot be widened even if the number of layer is increased.

In the case of the polarization splitting element in which the birefringent adhesive is sandwiched between the prisms, since the difference between refractive indices of the ordinary ray and the extraordinary ray of the adhesive is not large, it is necessary to set the incident angle to about 60° or more for the total reflection. Therefore, applications of usable optical systems are limited. In addition, a high polymer material or the like is used for the adhesive, so the polarization splitting element is inferior in terms of heat resistance and light fastness.

The stacked type polarization splitting element having the rectangular grating using the SWS structure is complex, which increases a manufacturing cost thereof. In addition, the Brewster's angle condition is used to transmit the P-polarized light, so it is hard to widen the incident angle characteristic as in the case of the dielectric multi-layer film. In particular, as is apparent from the grating structure shown in FIG. 36, the difference between refractive indices of the TE direction and the TM direction reduces as the incident angle increases. Therefore, an increase in reflectance at an incident angle that exceeds the Brewster's angle is larger than that in the case using the dielectric thin film. As a result, there is a limitation on the incident angle characteristic.

In the case of a polarization splitting element used for a liquid crystal projector or the like, a wide wavelength range which covers the entire visible light region, and a small FNo. for obtaining brightness (that is, a wide angle characteristic) are required.

SUMMARY OF THE INVENTION

The present invention has been made in view of the above-mentioned problems. An object of the present invention is to obtain a polarization splitting element which is suitable for use in a liquid crystal projector or the like, and has a wide wavelength range that covers is the entire visible light region and a wide angle characteristic which is usable at a small FNo.

An object of the present invention is to provide a high-performance polarization splitting element and an optical device using the polarization splitting element.

According to an aspect of the present invention, there is provided an optical element, including: a first periodic structure having a period shorter than a wavelength of used light; and a second periodic structure having a period shorter than the wavelength of the used light and in which a direction of the period is orthogonal to or substantially orthogonal to that of the first periodic structure, the second periodic structure being adjacent to the first periodic structure, wherein the first periodic structure and the second periodic structure transmit light in a predetermined oscillation direction and reflect light in an oscillation direction orthogonal to the predetermined oscillation direction.

According to an aspect of the present invention, an optical element comprises a first periodic structure having a period shorter than a wavelength of used light, a second periodic structure that has a period shorter than the wavelength of the used light and in which a direction of the period is orthogonal to or substantially orthogonal to that of the first periodic structure, the second periodic structure being adjacent to the first periodic structure, and a pair of optical elements disposed so as to sandwich the first periodic structure and the second periodic structure, wherein the first periodic structure and the second periodic structure transmit light having first polarization direction and reflect light having second polarization direction orthogonal to the first direction, and wherein the second polarization direction is substantially parallel to one of the periodic direction of the first periodic structure and the periodic direction of the second periodic structure.

According to a further aspect of the present invention, in the optical element, the used light has a wavelength between 400 nm and 700 nm.

According to a further aspect of the present invention, in the optical element, the following conditions are satisfied, $$n1p<n1s,$$

$$n2p>n2s,$$

$$|n1s-n2s|>|n1p-n2p|,$$

where n1p and n1s represent effective refractive indices of the first periodic structure with respect to P-polarized light and S-polarized light, respectively, and n2p and n2s represent effective refractive indices of the second periodic structure with respect to the P-polarized light and the S-polarized light, respectively.

According to a further aspect of the present invention, in the optical element, the following condition is satisfied, $$0.95 < n1p/n2p < 1.2,$$

where n1p and n1s represent effective refractive indices of the first periodic structure with respect to P-polarized light and S-polarized light, respectively.

According to a further aspect of the present invention, in the optical element, each of the first periodic structure and the second periodic structure is made of dielectric.

According to a further aspect of the present invention, in the optical element, the dielectric is titanium oxide.

According to a further aspect of the present invention, in the optical element, light which is made incident on the first periodic structure includes a light beam which is made incident on the first periodic structure at a Brewster's angle determined based on effective refractive indices of the first periodic structure and the second periodic structure with respect to P-polarized light.

According to a further aspect of the present invention, in the optical element, light which is made incident on the first periodic structure includes a light beam which is made incident on the first periodic structure at an angle not smaller than a critical angle determined based on effective refractive indices of the first periodic structure and the second periodic structure with respect to S-polarized light.

According to a further aspect of the present invention, in the optical element, the following condition is satisfied $$(n1s \cdot d_1 cos\theta)/\lambda s < 0.5,$$

where n1s represents the effective refractive index of the first periodic structure with respect to the S-polarized light, $d_1$ represents a thickness thereof, $\lambda s$ represents a shortest wavelength of the used light which is made incident on the first periodic structure, and $\theta$ represents an incident angle thereof.

According to a further aspect of the present invention, in the optical element, the following condition is satisfied, $$0.2 < d_2/\lambda s < 1.0,$$

where $d_2$ represents a thickness of the second periodic structure, $\lambda s$ represents the shortest wavelength of the used light which is made incident on the first periodic structure, and $\theta$ represents the incident angle thereof.

According to a further aspect of the present invention, in the optical element, each of the first periodic structure and the second periodic structure is a grating made of dielectric, and the following conditions are satisfied, $$0.3 < f1 < 1.0,$$

$$0.10 < f2 < 0.5,$$

where f1 represents a filling factor which is a ratio between the period of the first periodic structure and a width of a corresponding grating and f2 represents a filling factor which is a ratio between the period of the second periodic structure and a width of a corresponding grating.

According to a further aspect of the present invention, in the optical element, the period of the first periodic structure and the period of the second periodic structure are different from each other.

According to another aspect of the present invention, an optical device comprises an optical element set out in the foregoing, modulation device for modulating light emitted from the optical element based on an image signal; and a projection optical system for projecting the light modulated by the modulation means to a predetermined plane.

According to another aspect of the present invention, an optical element comprises a first periodic structure having a period shorter than a wavelength of used light, and a second periodic structure that has a period shorter than the wavelength of the used light and in which a direction of the period is orthogonal to or substantially orthogonal to that of the first periodic structure, the second periodic structure being adjacent to the first periodic structure, wherein the period of the first periodic structure and the period of the second periodic structure are different from each other.

According to a further aspect of the present invention, in the optical element, with respect to a first plane including a periodic direction of the first periodic structure and a normal to a plane of the first periodic structure and a second plane including a periodic direction of the second periodic structure and a normal to a plane of the second periodic structure, the period of the periodic structure in one of the first and second planes in which a maximal incident angle of a used light beam is larger than that in the other plane is smaller than the period of the other periodic structure in the other plane of the first and second planes.

According to a further aspect of the present invention, in the optical element, with respect to a first plane including a periodic direction of the first periodic structure and a normal to a plane of the first periodic structure and a second plane including a periodic direction of the second periodic structure and a normal to a plane of the second periodic structure, the period of the periodic structure in one of the first and second planes which is closer to parallel to the used light than the other plane is smaller than the period of the other periodic structure in the other plane of the first and second planes.

According to a further aspect of the present invention, in the optical element, with defining a representative light beam as a light beam which is emitted from the optical element and passes through an optical axis of the optical system, with respect to a first plane including a periodic direction of the first periodic structure and a normal to a plane of the first periodic structure and a second plane including a periodic direction of the second periodic structure in the optical element and a normal to a plane of the first periodic structure, the period of the periodic structure in one of the first and second planes which is closer to parallel to the representative light beam than the other plane is smaller than the period of the other periodic structure in the other plane of the first and second planes.

According to another aspect of the present invention, an optical device comprises an optical element according to claim 14, modulation device for modulating light emitted from the optical element based on an image signal; and a projection optical system for projecting the light modulated by the modulation means to a predetermined plane.

Various modes of the present invention will be disclosed in embodiments described later.

DETAILED DESCRIPTION OF THE PREFERRED EMBODIMENTS

Hereinafter, various preferred embodiments of the present invention will be described.

First, Embodiment 1 will be described. This embodiment shows an optical element in which a plurality of periodic structures each having structural birefringence are stacked. Adjacent periodic structures are stacked such that periodic directions thereof are substantially orthogonal to each other.

Therefore, a polarization splitting element in which both a wavelength characteristic and an incident angle characteristic are wide and an extinction ratio thereof is high is realized without a complex structure.

Figure 1:
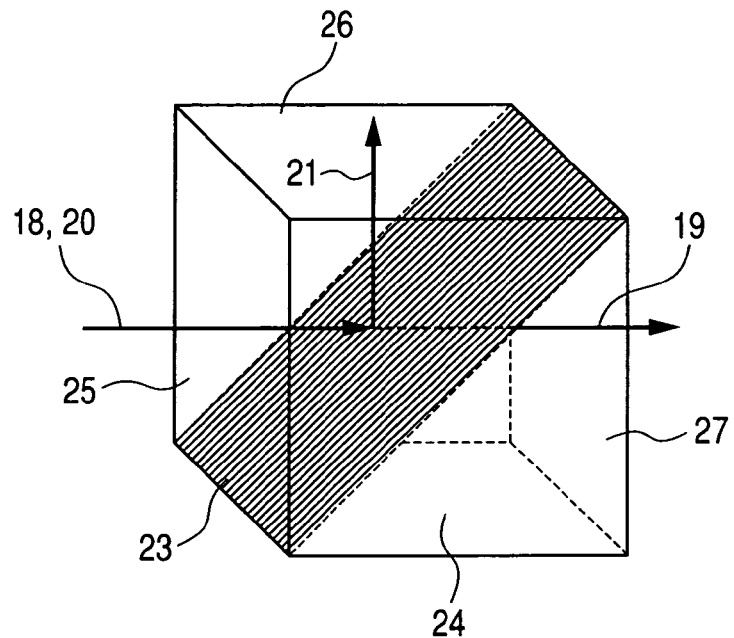
FIG. 1 is a structural view showing an optical element according to Embodiment 1 of the present invention.

FIG. 1 is a structural view showing a polarization splitting element according to this embodiment (Embodiment 1). FIG. 1 shows a state in which a polarization splitting layer 23 composed of a plurality of periodic structures each having structural birefringence is sandwiched by two prisms. The polarization splitting layer 23 and the two prisms compose an optical element having a polarization splitting function.

In FIG. 1, the polarization splitting layer 23 is tilted 45° relative to an incident surface 25 of the prism. When an incident light beam including a P-polarized light component 18 and an S-polarized light component 20 is perpendicularly made incident on the incident surface 25, the P-polarized light component 18 passes through the polarization splitting layer 23 to become passing light 19, and the S-polarized light component 20 is reflected on the polarization splitting layer 23 to become reflective light 21. In this embodiment, the optical element is assumed to be used for visible light.

Figure 2:
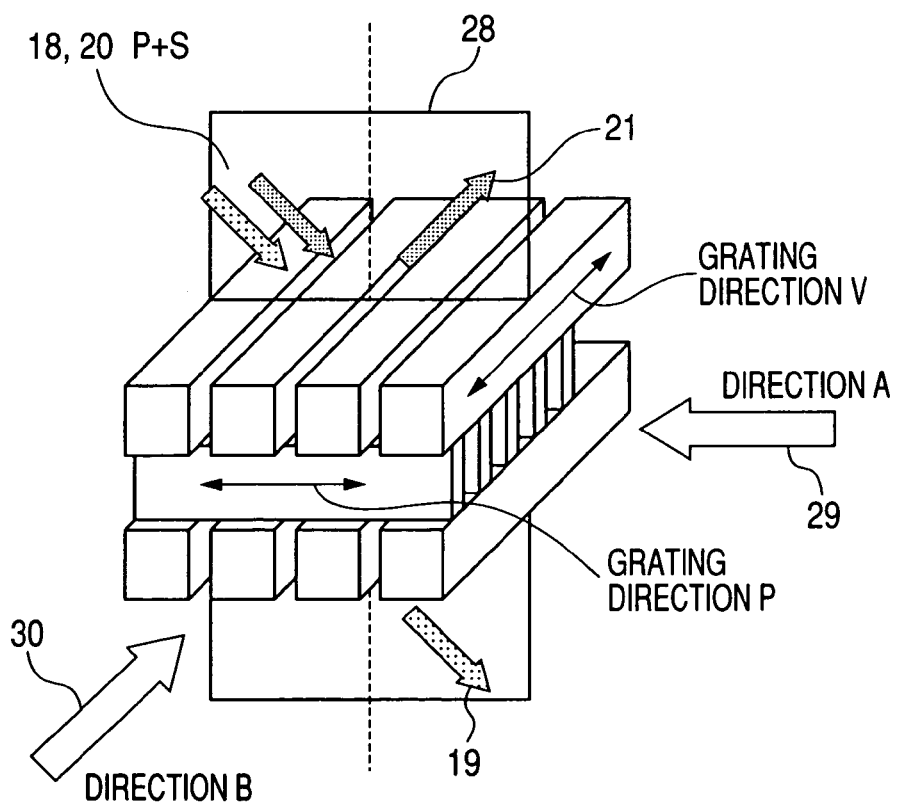
FIG. 2 is a schematic view showing a polarization splitting layer according to Embodiment 1 of the present invention.
Figure 3A:
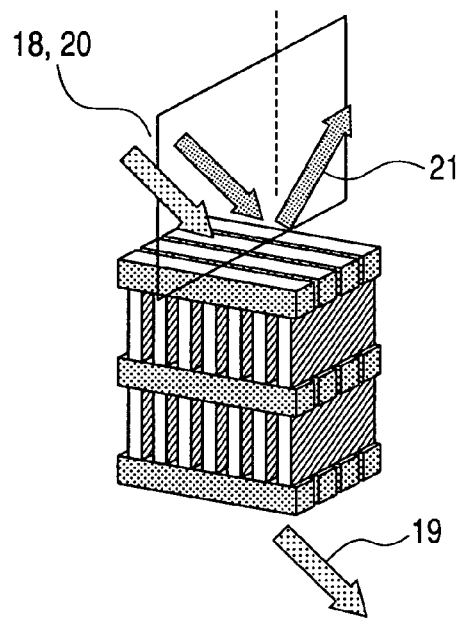
FIGS. 3A, 3B, and 3C are structural views showing the polarization splitting layer according to Embodiment 1 of the present invention.
Figures 3B, 3C:
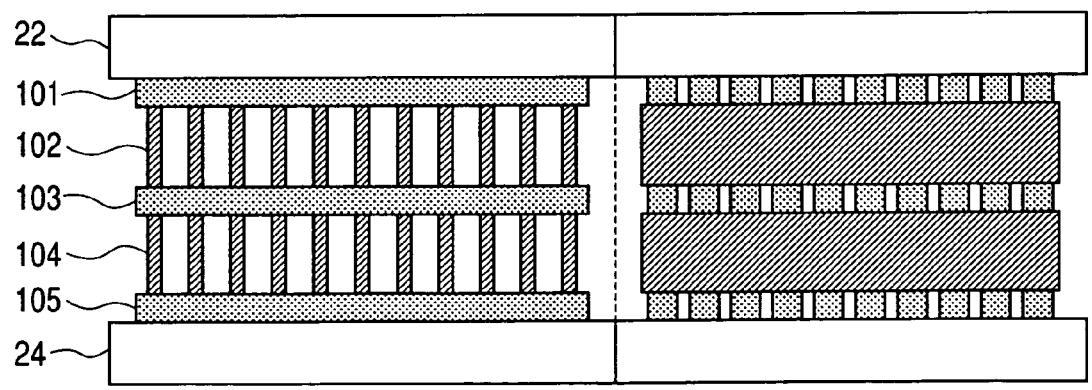

FIG. 2 is a conceptual view showing the polarization splitting layer 23. The polarization splitting layer 23 has a plurality of grating structures (periodic structures) stacked therein. Periodic directions of adjacent grating structures are substantially orthogonal to each other. In this embodiment, five one-dimensional grating structures corresponding to five layers are stacked. (FIG. 2 is the conceptual view, so only three one-dimensional grating structures are shown therein. The polarization splitting layer 23 having all the five one-dimensional grating structures is shown in FIGS. 3A, 3B, and 3C.) Assume that first, second, third, fourth, and fifth one-dimensional gratings are arranged in order from a light incident side (upper side of FIG. 2). A period of each of the grating structures is shorter than a wavelength of any incident light. Each of the grating structures exhibits structural birefringence.

As shown in FIG. 2, an incident surface on which the incident light beam (P-polarized light component 18 and S-polarized light component 20) is made incident is orthogonal to a periodic direction of the first one-dimensional grating. The periodic direction of the first one-dimensional grating is assumed to be a grating direction V. As shown in FIG. 2, a periodic direction of the second one-dimensional grating is orthogonal to the grating direction V and assumed to be a grating direction P.

When the light is made incident on the polarization splitting layer 23, the S-polarized light component is reflected thereon and the reflective light 21 thereof exits from an exit surface 26 different from the incident surface 25 located on the light incident side of the prism. At this time, the P-polarized light component passes through the polarization splitting layer 23 and the passing light 19 thereof exits from an exit surface 27 located on the light exit side of the prism.

FIG. 3A is an oblique perspective view showing all of the five layers of the one-dimensional gratings of the polarization splitting layer 23. FIG. 3B is a sectional view showing the gratings as viewed from a direction A indicated by an arrow 29 in FIG. 2. FIG. 3C is a sectional view showing the gratings as viewed from a direction B indicated by an arrow 30 in FIG. 2.

Table 1 shows design values related to each of the one-dimensional gratings of the polarization splitting layer 23 in this embodiment (Embodiment 1).

TABLE 1

Embodiment 1
Pitch 0.120 μm

| Layer number | Medium | Film thickness [μm] | Filling factor | Grating direction |
|---|---|---|---|---|
| 1 | $TiO_2$ | 0.073 | 0.70 | V |
| 2 | $TiO_2$ | 0.231 | 0.30 | P |
| 3 | $TiO_2$ | 0.076 | 0.70 | V |
| 4 | $TiO_2$ | 0.231 | 0.30 | P |
| 5 | $TiO_2$ | 0.073 | 0.70 | V |

Prism medium $n_p$ = 1.603

A material of each of the one-dimensional gratings is a titanium oxide $TiO_2$ which is a dielectric. Each of the one-dimensional gratings has a structure in which a dielectric and air are periodically alternately repeated. In this embodiment, the polarization splitting is realized using a relatively simple structure having five layers in total. Here, each of first, third, and fifth one-dimensional gratings 101, 103, and 105 is referred to as a layer H and each of second and fourth one-dimensional gratings 102 and 104 is referred to as a layer L. When a refractive index of a material of each of the one-dimensional gratings is given by n1, it is preferable to satisfy the following conditional expression (7).

$$1.5 < ni \quad (7)$$

The layer H and the layer L corresponding to the respective layers respectively exhibit high and low effective refractive indices with respect to the S-polarized light to be reflected. A thickness of the layer H is 73 nm to 76 nm and sufficiently satisfies the following conditional expression (8).

$$(n1s \cdot d_1 \cdot \cos \theta)/\lambda_s < 0.5 \quad (8)$$

Here, n1s and $d_1$ denote an effective refractive index of each of the layers H with respect to the S-polarized light and a thickness thereof, respectively. In addition, θ denotes an incident angle. In this embodiment, θ=45°. $\lambda_s$ denotes a wavelength of the incident light having a minimal wavelength. The optical element according to this embodiment is assumed to be used for the visible light. Therefore, the incident light is the visible light (400 nm to 700 nm) and $\lambda_s$ is 400 nm which is the minimal wavelength of those.

The conditional expression (8) completely achieves the reflection of the S-polarized light. In general, there has been known that the incident light is totally reflected without any passing in the case where an incident angle when light is made incident on a low refractive index medium from a high refractive index medium is equal to or larger than a critical angle $\theta_c$. However, in this time, evanescent light seeps through an extremely small region near an interface surface. When another medium exists in a region which the light reaches, the light passes therethrough. Such a phenomenon is attenuated total reflection (ATR). The conditional expression (8) is used to obtain a high reflectance over a wide-angle range and a wide-wavelength range based on the interference of ATR lights with one another. When $(n1s \cdot d_1 \cdot \cos \theta)/\lambda_s$ exceeds the upper limit of the conditional expression (8), that is, when the film thickness set in view of the incident angle becomes ½ of the wavelength, reflective light beams in ATR interferes with one another, thereby reducing the reflectance. When the film thickness changes, a reduction in reflectance due to the interference is caused every ½ change in wavelength. The conditional expression (8) is used to prevent the interference from occurring over a wide used wavelength range.

The layer L satisfies the following conditional expression (9). The conditional expression (9) is used to effectively utilize the reflection related to ATR.

$$0.2 < d_2/\lambda_s < 1.0 \qquad (9)$$

Here, $d_2$ denote a thickness of the layer L, which is 231 nm.

When the film thickness is decreased so that $d_2/\lambda_s$ becomes lower than the lower limit of the conditional expression (9), the transmittance of the ATP increases in an incident angle range equal to or larger than the critical angle. Therefore, sufficient reflection cannot be realized.

In view of the ATR, it is preferable to maximize the film thickness. However, even when the film thickness increases, the reflectance asymptotically approaches the total reflection, so that an effect corresponding to an increase in film thickness cannot be obtained. In the one-dimensional grating shape, the difficulty of manufacturing increases as the film thickness increases. Therefore, it is preferable to set the film thickness to the upper limit of the conditional expression (9).

A used angle range includes an angle which is equal to or smaller than the critical angle and at which normal reflection is caused. When the film thickness is set such that $d_2/\lambda_s$ becomes smaller than the upper limit of the conditional expression (9), a suitable result is obtained with respect to the interference due to the normal reflection.

In Embodiment 1, a glass material having a relatively low refractive index of about 1.603 is used for the prisms sandwiching the polarization splitting layer 23. An absolute value of a photoelastic coefficient of the prism is smaller than $0.1 \times 10^{-8}$ cm$^2$/N. Each of a dielectric of the layer H corresponding to the one-dimensional grating in the grating direction V and a dielectric of the layer L corresponding to the one-dimensional grating in the grating direction P is TiO$_2$ and has a high refractive index of 2.282. In order to efficiently produce a birefringence, a filling factor f1 of the layer H is set in the range of the conditional expression (10) and a filling factor f2 of the layer L is set in the range of the conditional expression (11). The filling factor in this embodiment is also the ratio of a TiO$_2$ width to a pitch.

$$0.3 < f1 < 1.0 \qquad (10)$$

$$0.10 < f2 < 0.5 \qquad (11)$$

Figure 10A:
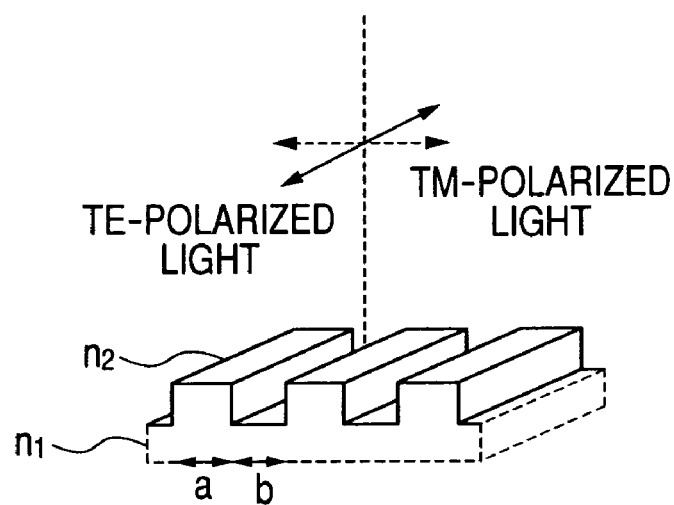
FIG. 10A is an explanatory view showing a model of one-dimensional SWS grating with respect to effective refractive indices.
Figure 10B:
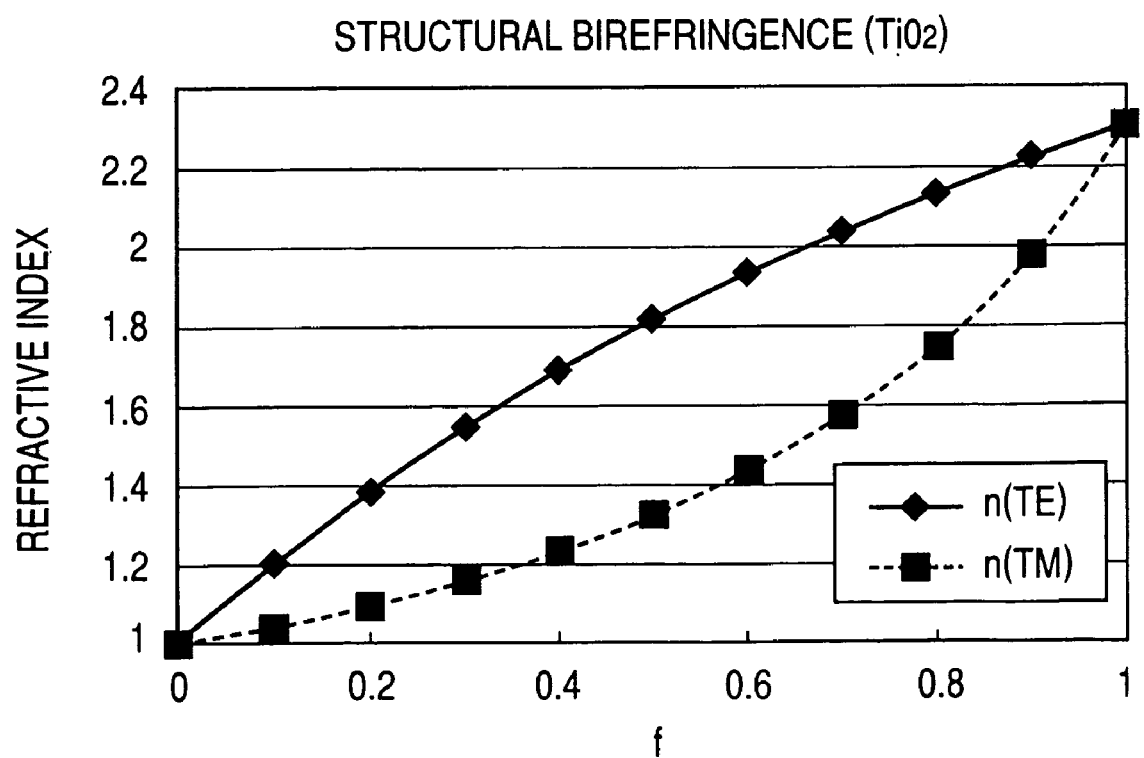
FIG. 10B is a graph showing changes in effective refractive indices relative to a filling factor f of $TiO_2$ in the one-dimensional SWS grating shown in FIG. 10A in which a medium of n1 is $TiO_2$ and a medium of n2 is air.
Figure 10C:
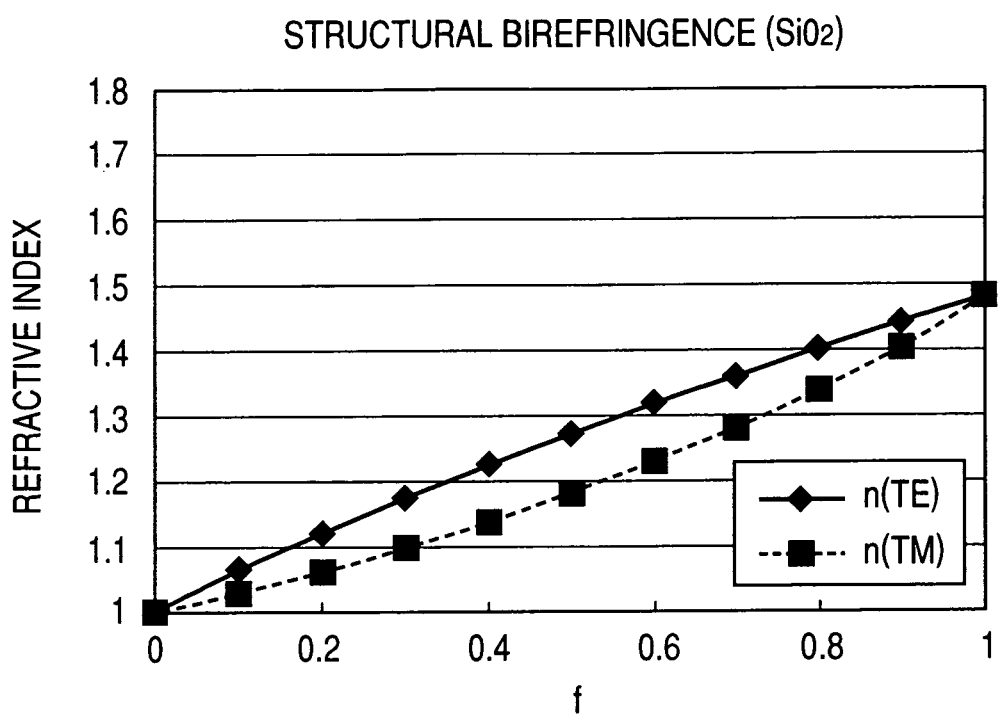
FIG. 10C is a graph showing changes in effective refractive indices relative to a filling factor f of $SiO_2$ in the one-dimensional SWS grating shown in FIG. 10A in which the medium of n1 is $SiO_2$ and the medium of n2 is air.
Figure 10D:
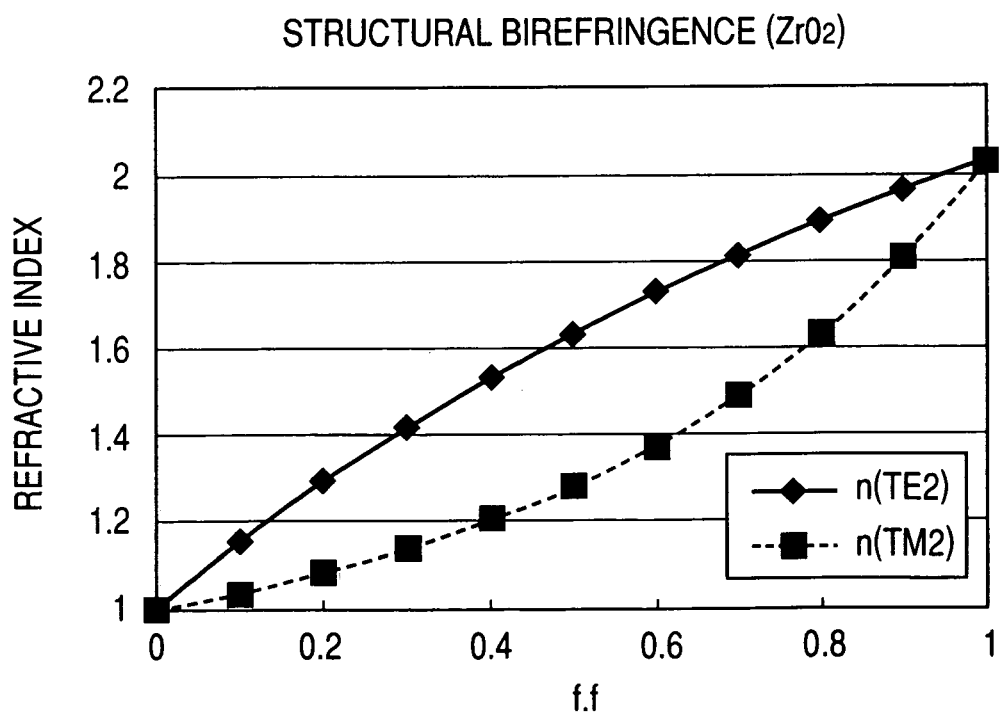
FIG. 10D is a graph showing changes in effective refractive indices relative to a filling factor f of $ZrO_2$ in the one-dimensional SWS grating shown in FIG. 10A in which the medium of n1 is $ZrO_2$ and the medium of n2 is air.

The conditional expressions (10) and (11) express conditions to efficiently produce structural birefringence. As shown in the graph of FIG. 10B, a large difference between the effective refractive indices of TE and TM causes large birefringence. In each of the cases of f=0 and f=1, the difference of refractive index to a medium becomes 0. In the case where f is about 0.5, the difference is maximum. Therefore, when the filling factors are set in the ranges of the conditional expressions (10) and (11), it is possible to efficiently use the effective refractive indices.

More preferably, the filling factors f1 and f2 satisfy the respective following conditional expressions (10a) and (11a), $$0.65 < f1 < 0.95 \qquad (10a)$$

$$0.2 < f2 < 0.45 \qquad (11a)$$

The effective refractive indices of the layer H and layer L that exhibit the structural birefringence are expressed by the expressions (4) and (5) described earlier. Here, TM corresponds to a polarized light component in a direction parallel to the periodic direction of a grating and TE corresponds to a polarized light component in a direction orthogonal to the periodic direction of the grating. With respect to the layer corresponding to the one-dimensional grating in the grating direction V, the P-polarized light becomes TM and the S-polarized light becomes TE. With respect to the layer corresponding to the one-dimensional grating in the grating direction P, the P-polarized light becomes TE and the S-polarized light becomes TM.

FIG. 10B is a graph showing the effective refractive indices related to the respective polarized light when the filling factor f (ratio of TiO$_2$ width to pitch) is changed in the case where one of mediums is TiO$_2$ and the other is air in the expressions (4) and (5).

As shown in Table 2, with respect to the P-polarized light, in the case of f=0.7 in the first one-dimensional grating, the effective refractive index in the TM direction becomes 1.60. In the case of f=0.3 in the second one-dimensional grating, the effective refractive index in the TE direction becomes 1.57. In other words, a difference between the effective refractive indices of the respective layers is small with respect to the P-polarized light and the effective refractive indices are close to the refractive index of the prism medium. Therefore, the reflection can be suppressed to obtain a high transmittance. In order to increase the transmittance with respect to the P-polarized light, it is preferable to satisfy the following conditional expression (12).

$$0.95 < n1p/n2p < 1.2 \qquad (12)$$

When n1p/n2p exceeds the upper limit of the conditional expression (12) or becomes smaller than the lower limit thereof, a difference between the effective refractive indices of the one-dimensional gratings with respect to the P-polarized light becomes larger. Therefore, the reflectance increases and the transmittance reduces. Table 2 shows effective refractive indices $n_p$ and $n_s$ of the respective one-dimensional gratings with respect to the P-polarized light and the S-polarized light, and values in the expressions (8) and (9).

TABLE 2

Embodiment 1
Values in conditional expressions

| Layer number | $n_p$ | $n_s$ | (8) | (9) |
|---|---|---|---|---|
| 1 | 1.60 | 2.05 | 0.265 | — |
| 2 | 1.57 | 1.16 | — | 0.578 |
| 3 | 1.60 | 2.05 | 0.275 | — |
| 4 | 1.57 | 1.16 | — | 0.578 |
| 5 | 1.60 | 2.05 | 0.265 | — |

$\theta = 45°$, $\lambda s = 400$ nm

When $n_H$=1.60, $n_L$=1.57, and $n_p$=1.603 are substituted into the expression (2), the Brewster's angle $\theta_B$ becomes about 44.3°. Therefore, the configuration satisfies a condition in which an incident light flux with an incident angle of 45° is substantially completely transmitted.

As shown in Table 2, with respect to the S-polarized light, in the case of the first one-dimensional grating, the effective refractive index in the TE direction becomes 2.05. In the case of the second one-dimensional grating, the effective refractive index in the TM direction becomes 1.16. When $n_1$=1.603 and $n_2$=1.16 are substituted into the expression (3), the critical angle θ$_C$ becomes about 46°. Therefore, the reflection related to the ATR is caused at a higher incident angle than the critical angle θ$_C$. The normal reflection on a dielectric interface is caused even on a low incident angle side. However, the incident angle is close to the critical angle and a difference between the refractive indices (2.05 and 1.16) is large. Thus, high reflectance is obtained in each interface.

As described above, with respect to the P-polarized light, the effective refractive indices of the one-dimensional gratings in the grating directions V and P become close to each other. With respect to the S-polarized light, the difference between the refractive indices becomes large. Therefore, the transmission and reflection of each of the polarized light beams are realized.

A relationship between the effective refractive indices of the one-dimensional gratings in the grating directions V and P can be efficiently realized by satisfying the following conditional expressions (12), (13), and (14).

$$n1p < n1s \quad (12)$$

$$n2p > n2s \quad (13)$$

$$|n1s - n2s| > |n1p - n2p| \quad (14)$$

Figure 11A:
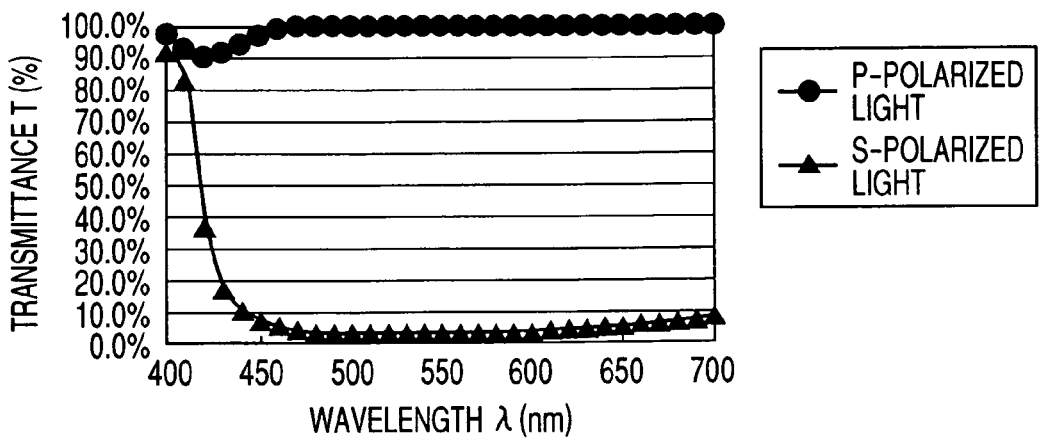
FIGS. 11A, 11B, and 11C are graphs showing transmittance of the optical element according to Embodiment 1 with respect to P-polarized light and S-polarized light in the cases where incident angles are 35°, 45°, and 55° each.
Figure 11B:
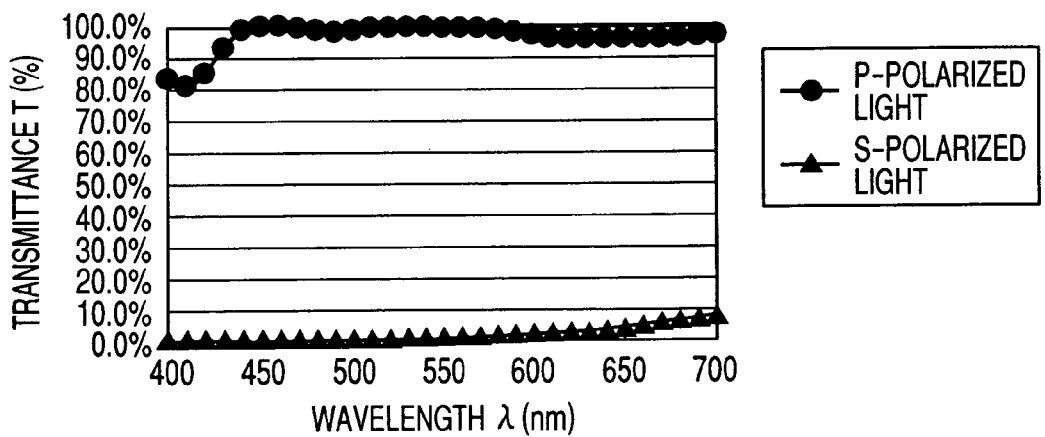
Figure 11C:
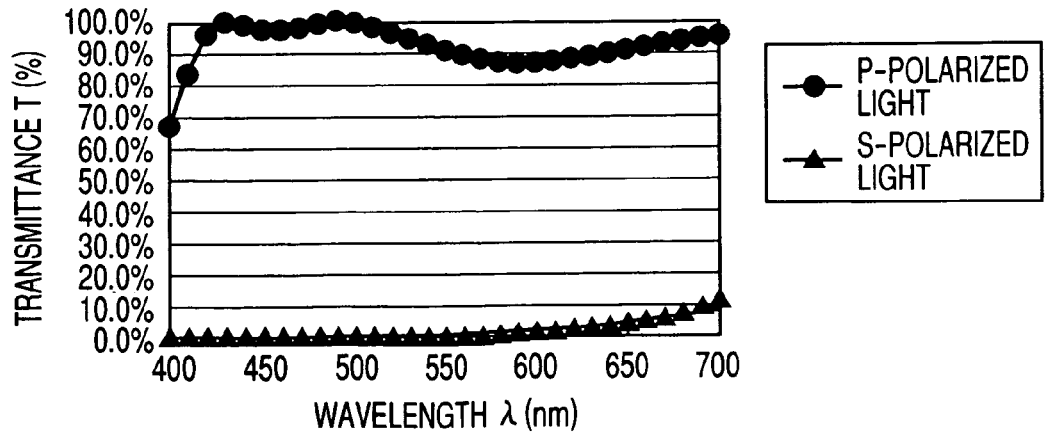

FIGS. 11A, 11B, and 11C show transmittance characteristic obtained by a simulation based on rigorous coupled-wave analysis (RCWA) using the design values. In each of FIGS. 11A, 11B, and 11C, the abscissa axis indicates a wavelength and the ordinate axis indicates the transmittance with respect to the P-polarized light and the S-polarized light. FIG. 11A shows the case where the incident angle is 35°. FIG. 11B shows the case where the incident angle is 45°. FIG. 11C shows the case where the incident angle is 55°. With respect to the P-polarized light, the transmittance lowers at the high incident angle. However, the lowered transmittance is a level that there is substantially no problem in practical use.

With respect to the S-polarized light, although the performance deteriorates on a short wavelength side of a low incident angle, there are little light beams passing through the polarization splitting layer in a very wide incident angle range of 35° to 55°, that is, complete reflectance is achieved.

In the embodiment 1, the polarizing direction of the light to be reflected (S-polarized light beam) is substantially parallel to either of the directions of the periodic structures whose periodic directions are perpendicular to each other (preferably the angle between the directions is not greater than 5 degrees) The characteristic of the polarization splitting improves by such a configuration.

Subsequently, other embodiments of the present invention will be described.

In each of Embodiments 2 to 4 described below, the polarization splitting layer 23 composed of periodic structures having structural birefringence is sandwiched by two prisms. This is identical to that of Embodiment 1. A schematic structure is the same as that of FIG. 1. A relationship between the incident light and the exit light is substantially identical to that of Embodiment 1. A structure of the polarization splitting layer 23 in each of Embodiments 2 to 4 is different from that of Embodiment 1. Hereinafter, Embodiments 2 to 4 will be described in order.

Table 3 shows design values related to a structure in Embodiment 2. In this embodiment, the number of stacked layers of one-dimensional gratings is three.

TABLE 3

Embodiment 2
Pitch 0.120 μm

| Layer number | Medium | Film thickness [μm] | Filling factor | Grating direction |
|---|---|---|---|---|
| 1 | TiO$_2$ | 0.351 | 0.21 | P |
| 2 | TiO$_2$ | 0.066 | 0.85 | V |
| 3 | TiO$_2$ | 0.351 | 0.22 | P |

Prism medium n$_p$ = 1.603

Figure 4A:
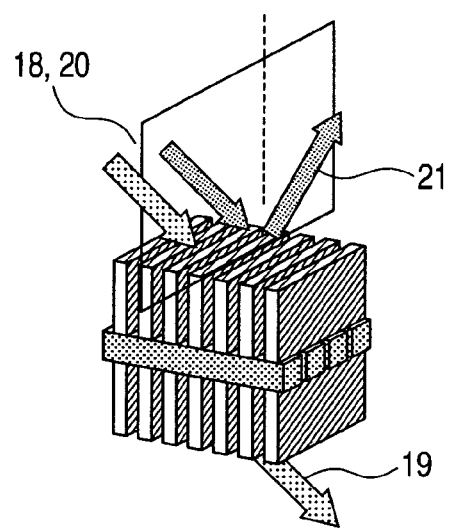
FIGS. 4A, 4B, and 4C are structural views showing a polarization splitting layer according to Embodiment 2 of the present invention.
Figures 4B, 4C:
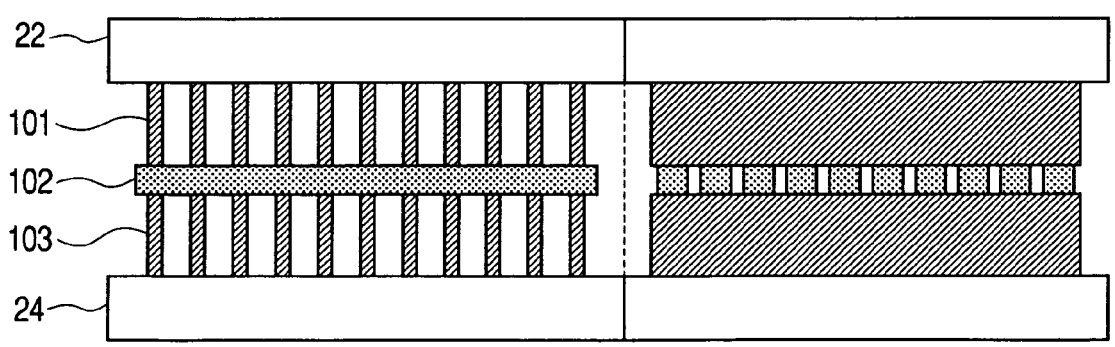

FIG. 4A is an oblique structural view showing gratings in Embodiment 2. FIG. 4B is a sectional structural view showing the gratings as viewed from the direction A indicated by the arrow 29 in FIG. 2. FIG. 4C is a sectional structural view showing the gratings as viewed from the direction B indicated by the arrow 30 in FIG. 2. Each of the one-dimensional gratings has a structure in which air and TiO$_2$ are alternately repeated. Table 4 shows the values in the conditional expressions (8) and (9).

TABLE 4

Embodiment 2
Values in conditional expressions

| Layer number | n$_p$ | n$_s$ | (8) | (9) |
|---|---|---|---|---|
| 1 | 1.71 | 1.24 | — | 0.878 |
| 2 | 1.60 | 2.05 | 0.285 | — |
| 3 | 1.71 | 1.24 | — | 0.878 |

θ = 45°, λs = 400 nm

As is apparent from Table 2, the conditional expressions (8) and (9) are satisfied in Embodiment 2. In addition, the conditional expressions (10) and (11) are satisfied. In this embodiment, the respective one-dimensional gratings are suitably set to realize the polarization splitting layer using a simple structure having three layers in total.

Figure 12A:
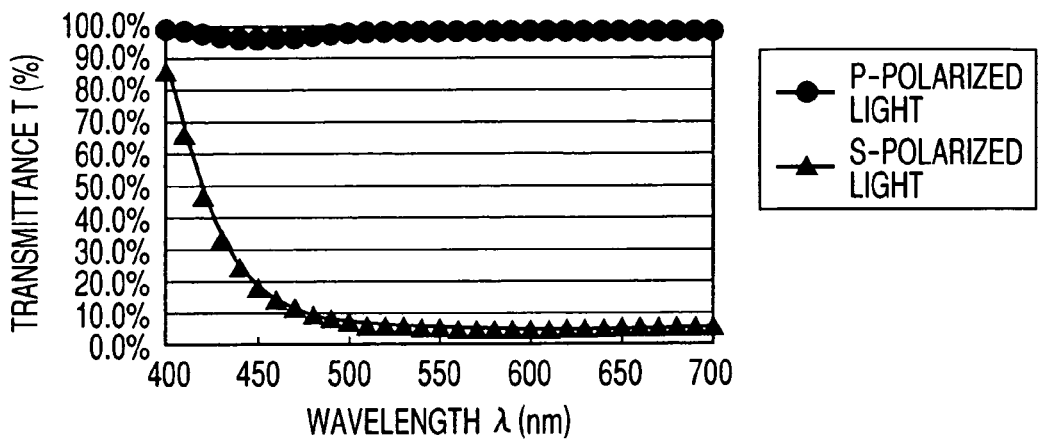
FIGS. 12A, 12B, and 12C are graphs showing transmittance of an optical element according to Embodiment 2 with respect to the P-polarized light and the S-polarized light in the cases where the incident angles are 35°, 45°, and 55° each.
Figure 12B:
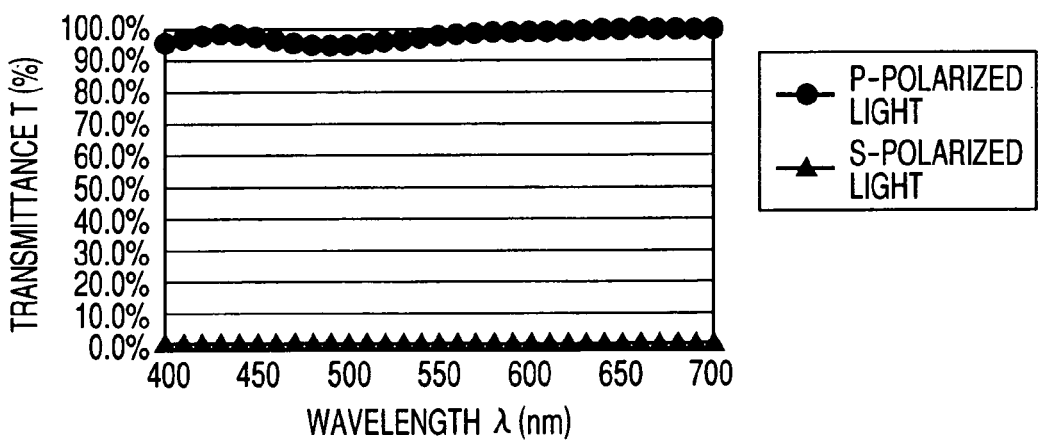
Figure 12C:
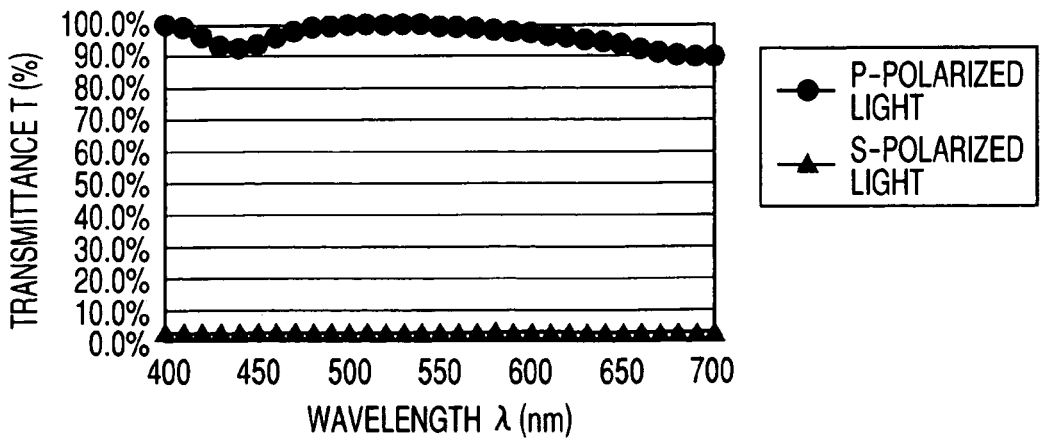

FIGS. 12A, 12B, and 12C show transmittance characteristics obtained by a simulation based on RCWA calculation in Embodiment 2. The reflection of the S-polarized light deteriorates at the low incident angle. The S-polarized light passes through the polarization splitting layer in all wavelengths, however, sufficient reflectance is obtained at each of the incident angles of 45° and 55°. With respect to the P-polarized light, sufficient transmittance is obtained over the entire angle range and the entire wavelength range, with the result that a preferable performance is realized.

Figure 5A:
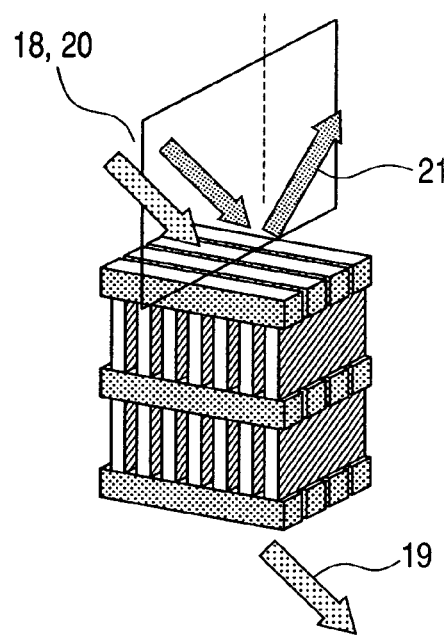
FIGS. 5A, 5B, and 5C are structural views showing a polarization splitting layer according to Embodiment 3 of the present invention.
Figures 5B, 5C:
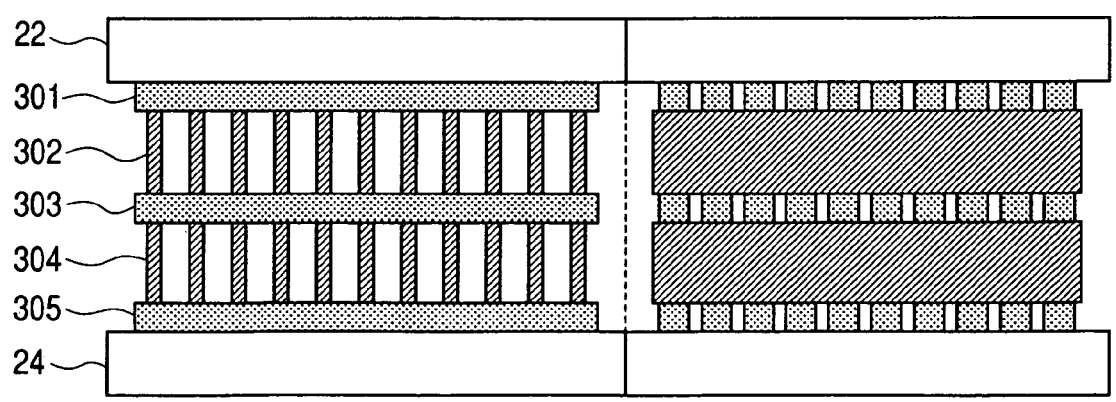

Subsequently, Embodiment 3 will be described. Table 5 shows the design values in Embodiment 3. FIGS. 5A, 5B, and 5C show an outer shape and sectional shapes.

TABLE 5

Embodiment 3
Pitch 0.120 μm

| Layer number | Medium | Film thickness [μm] | Filling factor | Grating direction |
|---|---|---|---|---|
| 1 | TiO$_2$ | 0.073 | 0.90 | V |
| 2 | TiO$_2$ | 0.231 | 0.30 | P |
| 3 | TiO$_2$ | 0.076 | 0.90 | V |
| 4 | TiO$_2$ | 0.231 | 0.30 | P |
| 5 | TiO$_2$ | 0.073 | 0.90 | V |

Prism medium n$_p$ = 1.603

The conditional-expressions (8) and (9) are satisfied as shown in Table 6. In addition, conditional expressions (10) and (11) are satisfied.

TABLE 6

Embodiment 3
Values in conditional expressions

| Layer number | $n_p$ | $n_s$ | (8) | (9) |
|---|---|---|---|---|
| 1 | 1.99 | 2.23 | 0.288 | — |
| 2 | 1.57 | 1.16 | — | 0.578 |
| 3 | 1.99 | 2.23 | 0.300 | — |
| 4 | 1.57 | 1.16 | — | 0.578 |
| 5 | 1.99 | 2.23 | 0.288 | — |

$\theta = 45°$, $\lambda s = 400$ nm

Figure 13A:
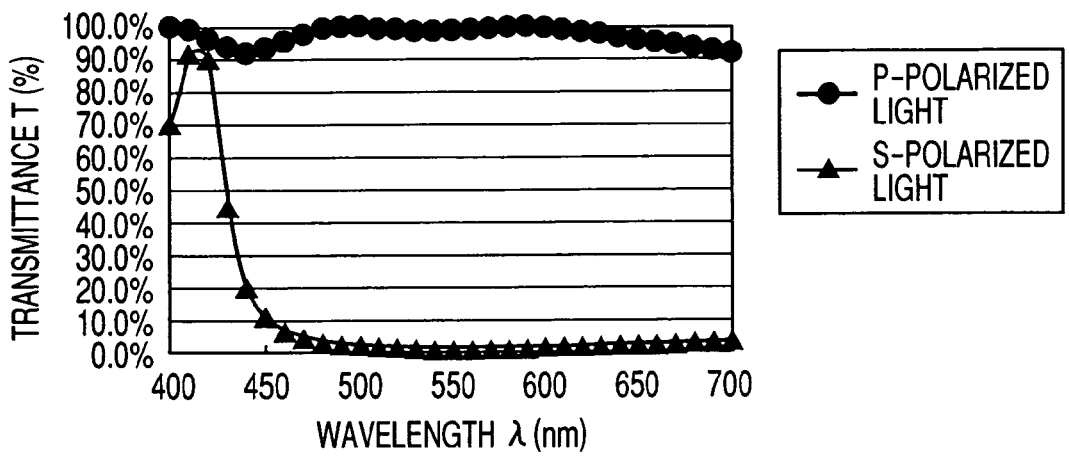
FIGS. 13A, 13B, and 13C are graphs showing transmittance of an optical element according to Embodiment 3 with respect to the P-polarized light and the S-polarized light in the cases where the incident angles are 35°, 45°, and 55° each.
Figure 13B:
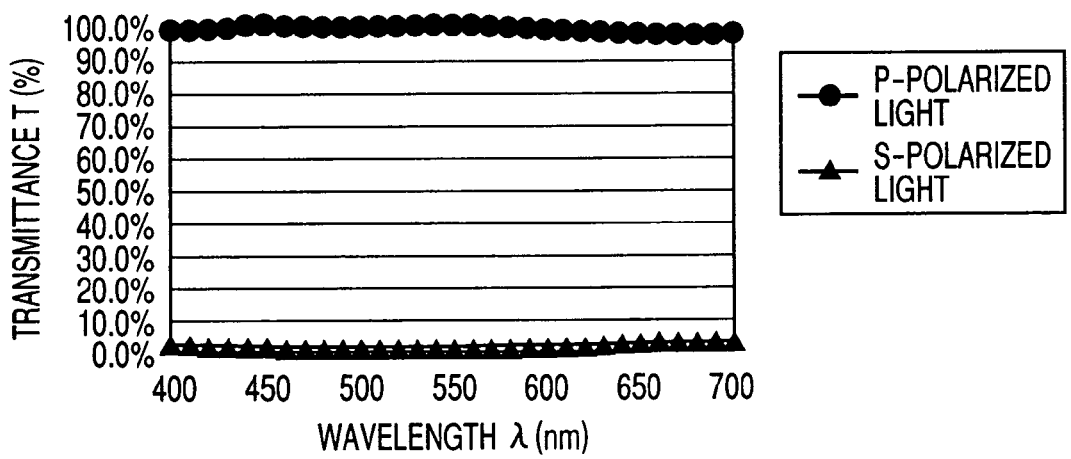
Figure 13C:
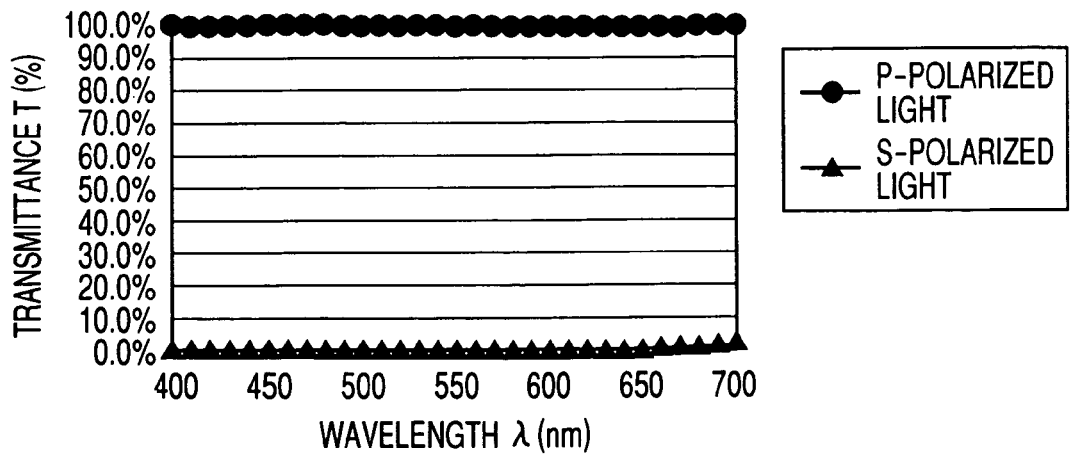

FIGS. 13A, 13B, and 13C show transmittance characteristics obtained by a simulation based on RCWA calculation in Embodiment 3. The reflectance related to the S-polarized light on a short wavelength side reduces at the low incident angle. On the other hand, the transmittance related to the P-polarized light is improved, so that the entire performance is preferable.

Figure 6A:
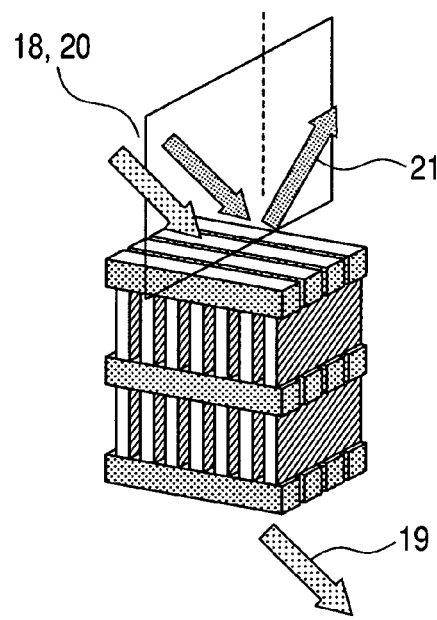
FIGS. 6A, 6B, and 6C are structural views showing a polarization splitting layer according to Embodiment 4 of the present invention.
Figures 6B, 6C:
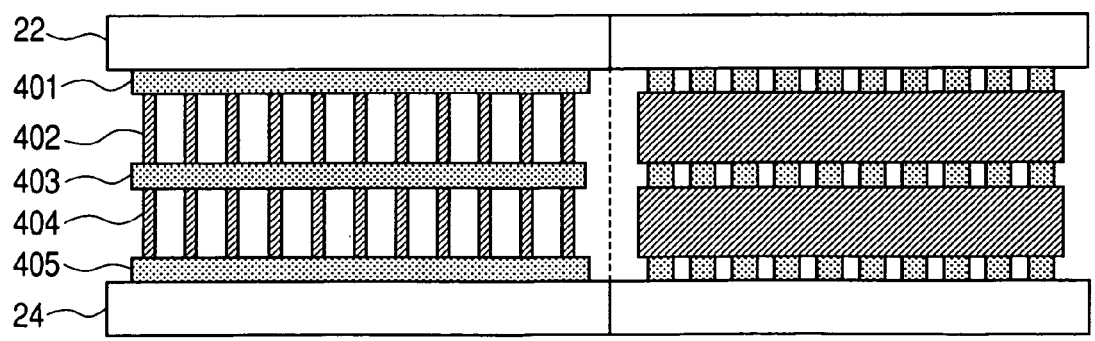

Subsequently, Embodiment 4 will be described. Table 7 shows the design values in Embodiment 4. FIGS. 6A, 6B, and 6C show an outer shape and sectional shapes.

TABLE 7

Embodiment 4
Pitch 0.120 μm

| Layer number | Medium | Film thickness [μm] | Filling factor | Grating direction |
|---|---|---|---|---|
| 1 | TiO$_2$ | 0.073 | 0.90 | V |
| 2 | ZrO$_2$ | 0.182 | 0.30 | P |
| 3 | TiO$_2$ | 0.075 | 0.90 | V |
| 4 | ZrO$_2$ | 0.182 | 0.30 | P |
| 5 | TiO$_2$ | 0.073 | 0.90 | V |

Prism medium $n_p = 1.603$

The conditional expressions (8) and (9) are satisfied as shown in Table 8. In addition, conditional expressions (10) and (11) are satisfied.

TABLE 8

Embodiment 4
Values in conditional expressions

| Layer number | $n_p$ | $n_s$ | (8) | (9) |
|---|---|---|---|---|
| 1 | 1.99 | 2.23 | 0.288 | — |
| 2 | 1.42 | 1.15 | — | 0.455 |
| 3 | 1.99 | 2.23 | 0.296 | — |
| 4 | 1.42 | 1.15 | — | 0.455 |
| 5 | 1.99 | 2.23 | 0.288 | — |

$\theta = 45°$, $\lambda s = 400$ nm

Figure 14A:
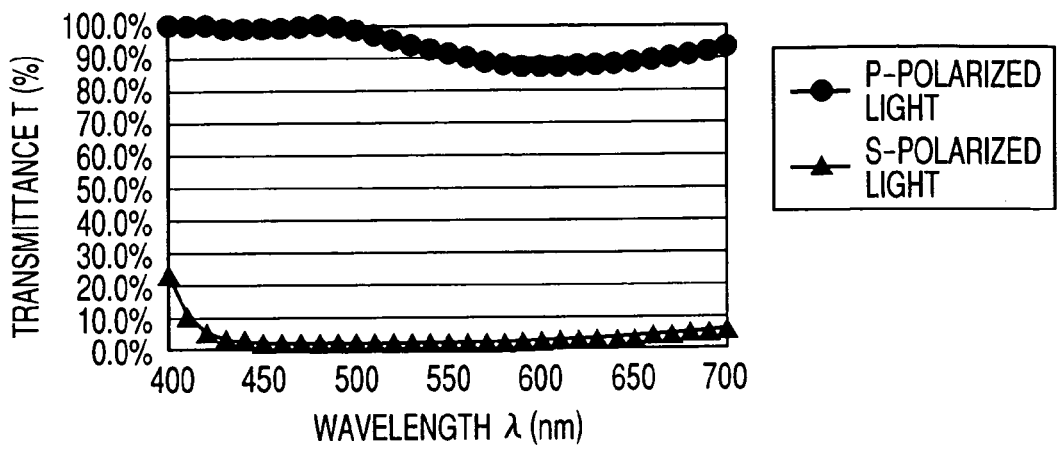
FIGS. 14A, 14B, and 14C are graphs showing transmittance of an optical element according to Embodiment 4 with respect to the P-polarized light and the S-polarized light in the cases where the incident angles are 35°, 45°, and 55° each.
Figure 14B:
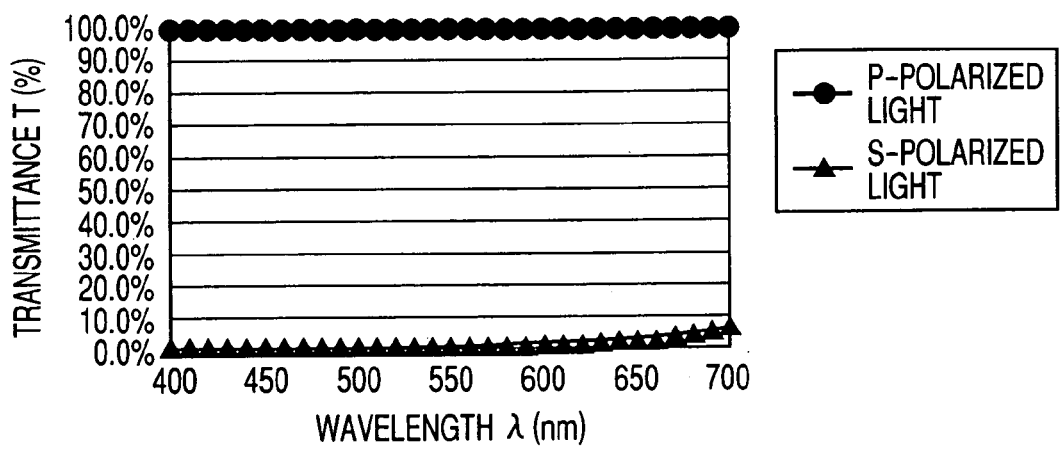
Figure 14C:
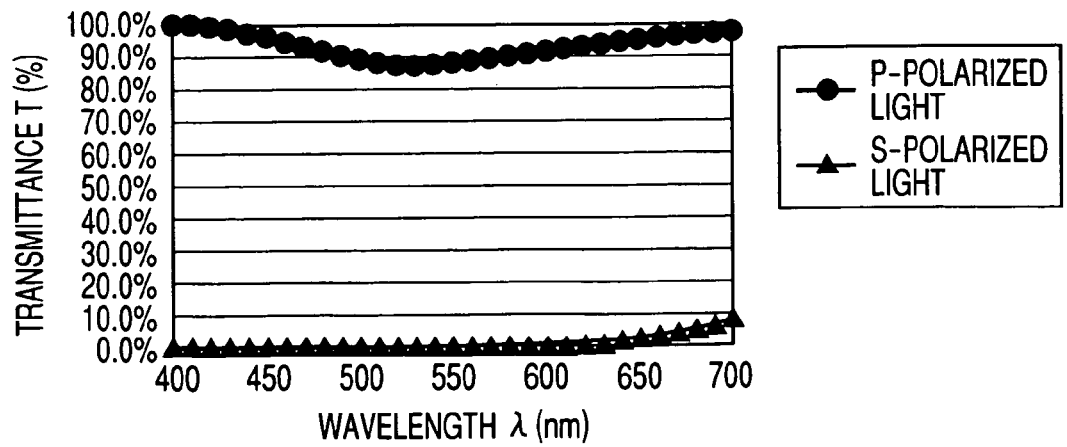

FIGS. 14A, 14B, and 14C show transmittance characteristics obtained by a simulation based on RCWA calculation in Embodiment 4. A five-layer structure is used. A dielectric for the second one-dimensional grating corresponding to the layer L is ZrO$_2$. When the filling factor f is 0.3, substantially the same birefringence as that of TiO$_2$ is obtained. The transmittance related to the P-polarized light reduces at the low incident angle and the high incident angle. On the other hand, with respect to the S-polarized light, preferable reflectance is obtained at all incident angles and over the entire wavelength range.

Figure 7:
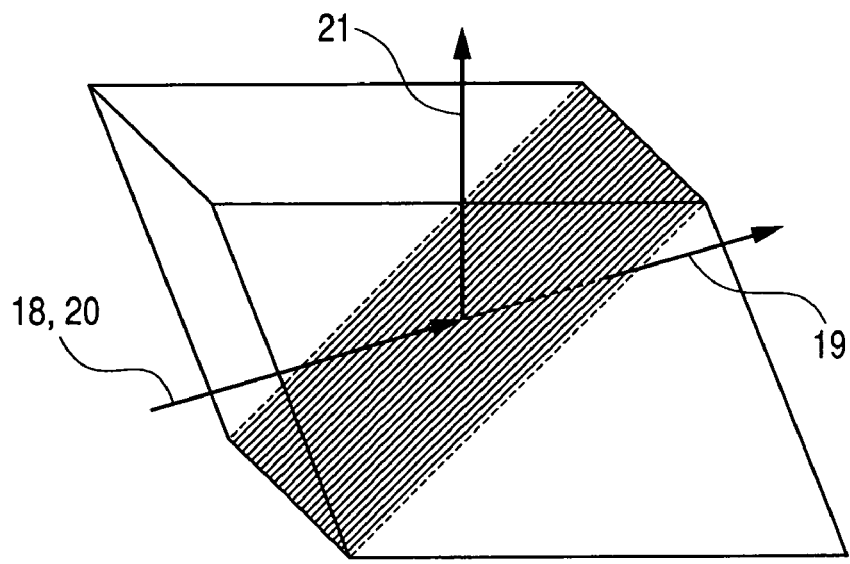
FIG. 7 is a structural view showing a polarization splitting layer according to Embodiment 5 of the present invention.

Subsequently, Embodiment 5 of the present invention will be described. FIG. 7 is a structural view showing an optical element according to Embodiment 5. Although the rectangular prism is used in each of Embodiments 1 to 4, a prism deformed in a rhombic shape is used in this embodiment. In Embodiment 5, the same polarization splitting layer as described in any one of Embodiments 1 to 4 is sandwiched by two prisms deformed in the rhombic shape. In FIG. 7, the incident light beams 18 and 20 from the left are perpendicularly made incident on a prism surface and then made incident on the polarization splitting layer at an angle larger than 45°. The total reflection on the polarization splitting layer becomes easier as the incident angle increases. Therefore, the prism is deformed in the rhombic shape at a tilt of about 10° to obtain the incident angle larger than that in the rectangular prism by 5°. Thus, the reflectance with respect to the S-polarized light can be increased.

Figure 8:
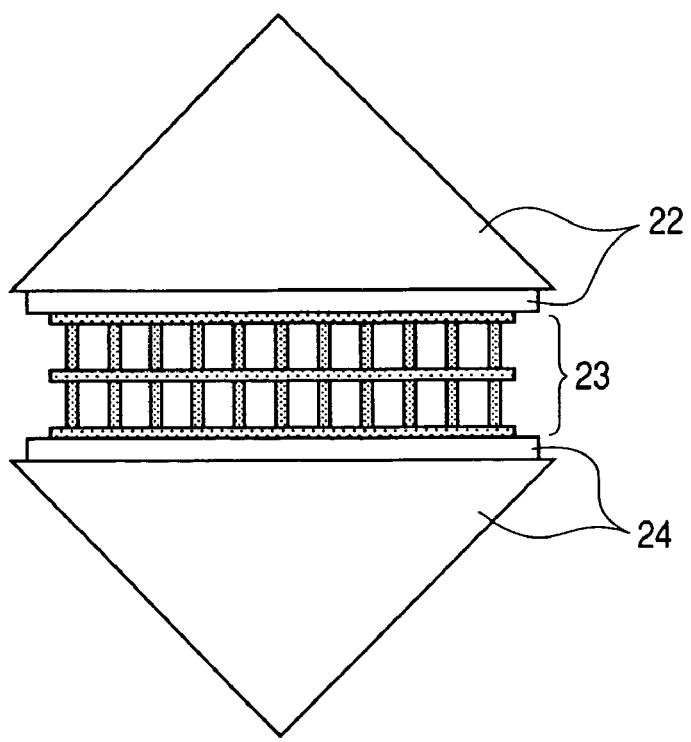
FIG. 8 is a structural view showing a polarization splitting layer according to Embodiment 6 of the present invention.

Subsequently, Embodiment 6 of the present invention will be described. FIG. 8 is a structural view showing an optical element according to Embodiment 6. The same polarization splitting layer as described in any one of Embodiments 1 to 4 is sandwiched by plates made of substantially the same material as that of the prism and the resultant is additionally sandwiched by triangular prisms. The polarization splitting layer that requires micro-machining is sandwiched by glass plates to construct a single unit. Therefore, the prisms that require shape performances such as angles, sizes, and profile irregularities are separated from each other to improve productivity.

Subsequently, Embodiment 7 of the present invention will be described. In each of the optical elements described in the embodiments up to here, the pitches (periods) of the one-dimensional gratings composing the polarization splitting layer are equal to one another. On the other hand, in this embodiment, the pitches of the plurality of one-dimensional gratings composing the polarization splitting layer are made different from one another. In particular, when the pitches are suitably set according to the incident angles of incident light and the incident directions thereof, the polarization splitting layer which is easily produced is provided while desirable performance is realized.

As described above, when the period of the one-dimensional grating is made equal to or shorter than the wavelength of the incident light, the grating exhibits the birefringent characteristic relative to the incident light, and the refractive index thereof can be given as the effective refractive index.

A condition in which the refractive index of the one-dimensional grating can be given as the effective refractive index is a condition in which the pitch of the grating is sufficiently small and the diffraction of the incident light does not occur.

Figure 15:
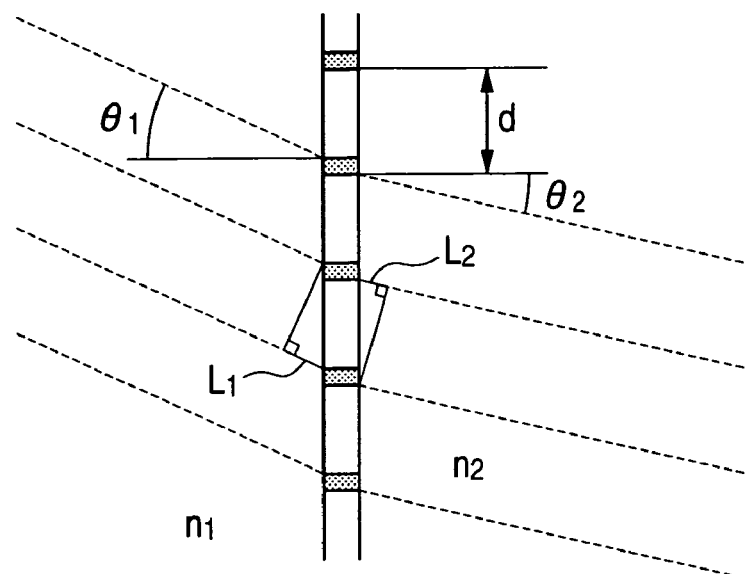
FIG. 15 is a schematic explanatory view showing diffraction caused by a grating.

As shown in FIG. 15, assume that a refractive index of a light incident side medium of a grating having a pitch d is given by n1, a refractive index of a light exit side medium thereof is given by n2, an incident angle of the incident light is given by θ1, and an exit angle of the exit light caused by diffraction is given by θ2. Here, when an optical path difference (L1–L2) between adjacent light beams becomes an integral multiple of the wavelength, diffraction light is produced. This is expressed by the following expression (15). When this expression is satisfied, the diffraction occurs, $$d\, n1 \sin \theta 1 - d\, n2 \sin \theta 2 = m\lambda \quad (15),$$

where m is an integer.

When the expression (15) doesn't have any solution except m=0, the diffraction does not occur.

Each of the refractive indices of the light incident side medium and the light exit side medium is set to n and the expression (15) is modified to the expression (16).

$$\sin\theta_1 - \sin\theta_2 = m\lambda/dn \qquad (16)$$

When θ1 and θ2 take arbitrary values, the left side of the expression (16) becomes a range expressed by the expression (17).

$$-2 \leq \sin\theta_1 - \sin\theta_2 \leq 2 \qquad (17)$$

Therefore, when λ/dn is larger than the left side, the diffraction does not occur. That is, the expression (18) is a condition for preventing the diffraction from occurring at all incident angles.

$$d < \lambda/2n \qquad (18)$$

However, when an element satisfying the above-mentioned condition is sandwiched between the two prisms (prism portions) as in the case of the polarization splitting layer, the refractive index n in the conditional expression (18) becomes larger than that of air. Therefore, a pitch for preventing diffraction from occurring narrows. In the above-mentioned one-dimensional grating, when the pitch is narrowed without changes in filling factor and thickness h of the grating, a ratio between a height of the grating and a width thereof (aspect ratio) becomes larger, leading to an increase in the difficulty of manufacturing.

In this embodiment, the pitches are suitably set according to the incident angle of a used light flux and the direction thereof, so that the optical element which is easily manufactured is realized while the condition on which diffraction is prevented from occurring with respect to all light fluxes is maintained.

The optical element according to Embodiment 7 has the stricture in which the polarization splitting layer 23 is sandwiched by the prisms as shown in FIG. 1. Table 9 shows values related to the structure of the polarization splitting layer 23 of Embodiment 7.

Although the visible light band range is defined as the wavelength in use in the embodiments described above, the wavelength band range in use may be defined the range of 450 nm to 700 nm in which the difference in transmittance between S-polarized light and P-polarized light is not less than 70%. Since the difference in transmittance between S-polarized light and P-polarized light is not less than 80% in a wavelength band range of 480 nm to 650 nm, the excellent characteristic as a polarization splitting element (polarization beam splitter) is proved. On the other hand, the period of the periodic structure in this embodiment is to be configured-preferably not greater than 400 nm, more preferably, not greater than 350 nm. Off course, the structure having a periodic structure can contain a layer which has a function other than polarization splitting function and whose period is greater than 400 nm.

As in Embodiment 1, the polarization splitting layer 23 is tilted 45° with respect to the incident surface 25 of the prism as shown in FIG. 1. The P-polarized light 18 and the S-polarized light 20 of the incident light beam which is perpendicularly made incident on the incident surface 25 are made incident on the polarization splitting layer 23. The S-polarized light is reflected on the polarization splitting layer 23 to become the reflective light 21. The reflective light 21 exits from the exit surface 26 different from the incident surface 25 of a prism 22 located on the light incident side as shown in FIG. 1. The P-polarized light passes through the polarization splitting layer 23 to become the passing light 19. The passing light 19 exits from the exit surface 27 of a prism 24 located on the light exit side.

Figure 16:
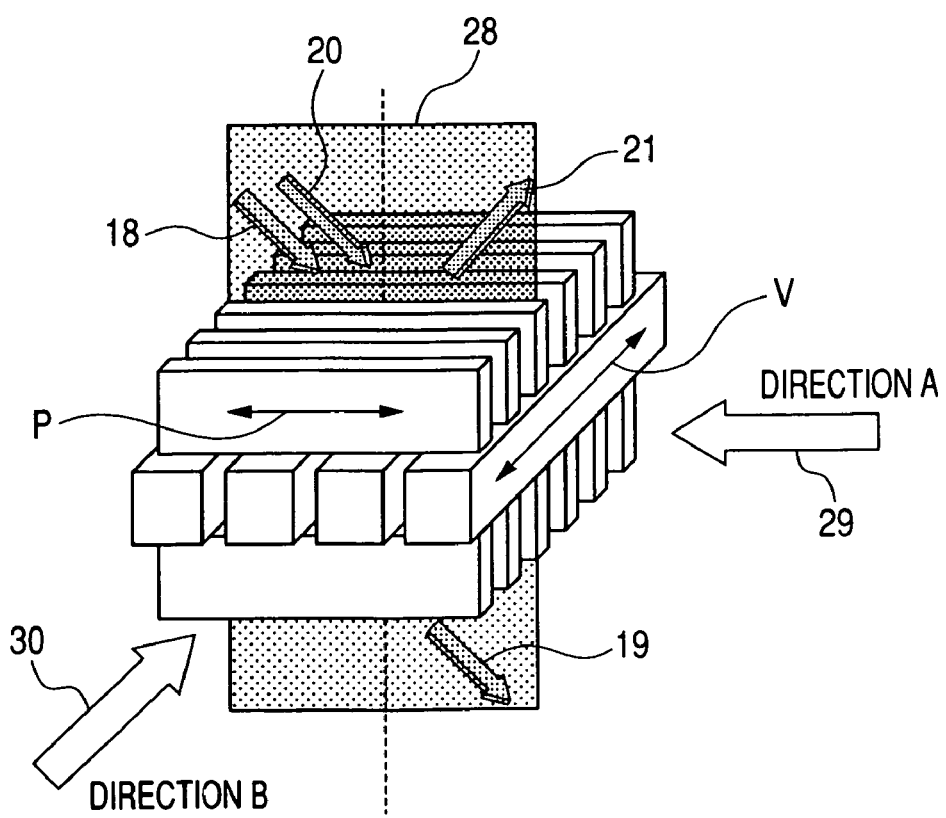
FIG. 16 is a schematic explanatory view showing directions of a polarization splitting layer according to Embodiment 7 of the present invention.

FIG. 16 is a schematic view showing grating directions. As shown in FIG. 2, an incident plane 28 within which light is made incident on the polarization splitting layer 23 and the first one-dimensional grating of the polarization splitting layer 23 are parallel to each other and the parallel direction is assumed to be the grating direction P. As shown in FIG. 2, the second one-dimensional grating is located perpendicular to the incident plane 28, and the perpendicular direction is assumed to be the grating direction V.

Figure 17:
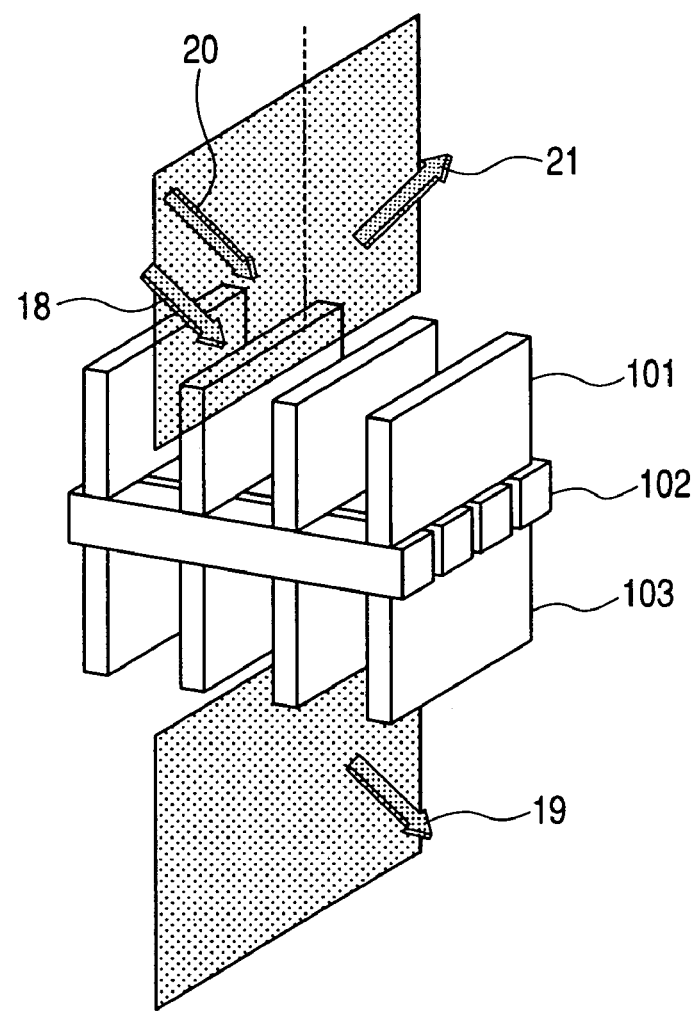
FIG. 17 is a perspective view showing the polarization splitting layer according to Embodiment 7 of the present invention.
Figure 18:
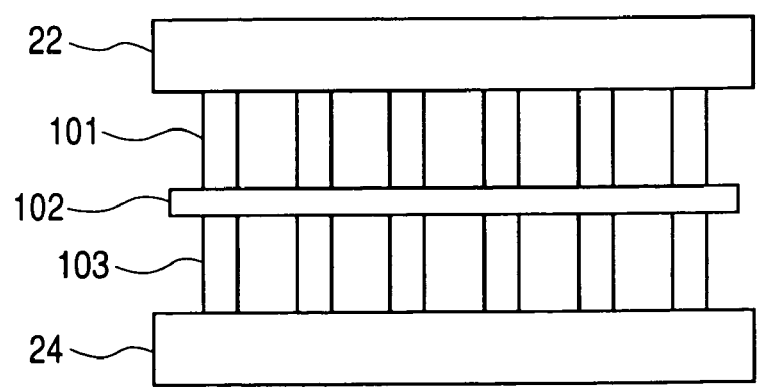
FIG. 18 is a sectional view showing the polarization splitting layer as viewed from a direction A, according to Embodiment 7 of the present invention.
Figure 19:
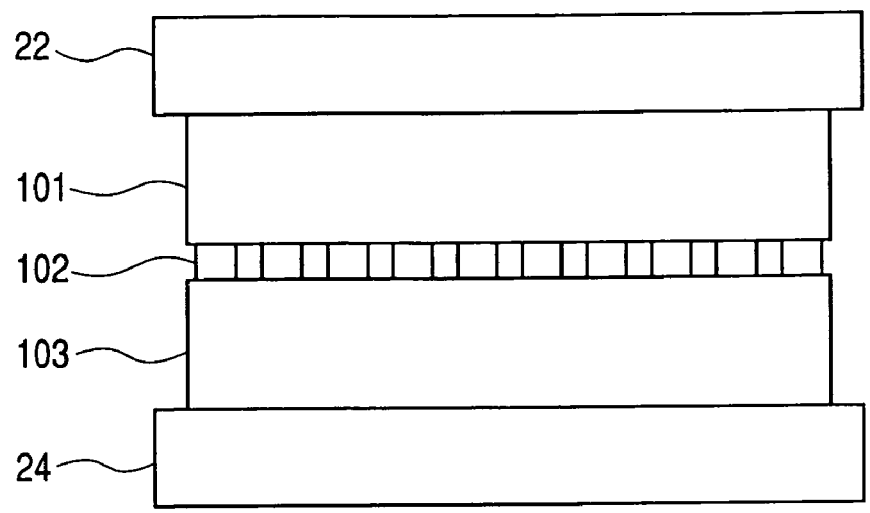
FIG. 19 is a sectional view showing the polarization splitting layer as viewed from a direction B, according to Embodiment 7 of the present invention.

FIG. 17 is an oblique perspective view showing the polarization splitting layer 23. FIG. 18 is a sectional structural view showing the gratings as viewed from the direction A indicated by the arrow 29 in FIG. 16. FIG. 19 is a sectional structural view showing the gratings as viewed from the direction B indicated by the arrow 30 in FIG. 16. The first and third one-dimensional gratings 101 and 103 are of the layer L having the grating direction P in which air and a dielectric are alternately repeated. The second one-dimensional grating 102 is of the layer H having the grating direction V in which the air and the dielectric are alternately repeated. The polarization splitting can be realized using a relatively simple structure having three layers in total. $TiO_2$ is used as the dielectric.

In Embodiment 7, as is apparent from the design values in Table 9, a glass material having a relatively low refractive index of about 1.603 is used for the prism. In order to efficiently produce birefringence, each of a dielectric of the layer H which is the one-dimensional grating having the grating direction V and a dielectric of the layer L which is the one-dimensional grating having the grating direction P is made of $TiO_2$ having a high refractive index of 2.282, and the filling factor of the layer L is set to 0.18 and the filling factor of the layer H is set to 0.84.

Figure 20:
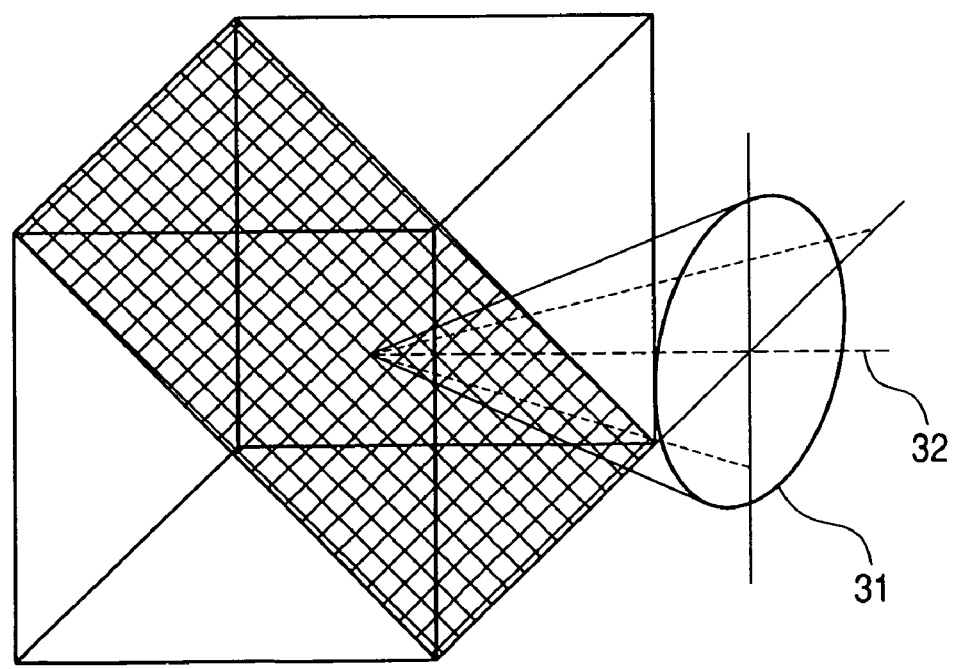
FIG. 20 is a schematic view showing a light flux which is made incident on an optical element according to Embodiment 7 of the present invention.
Figure 21:
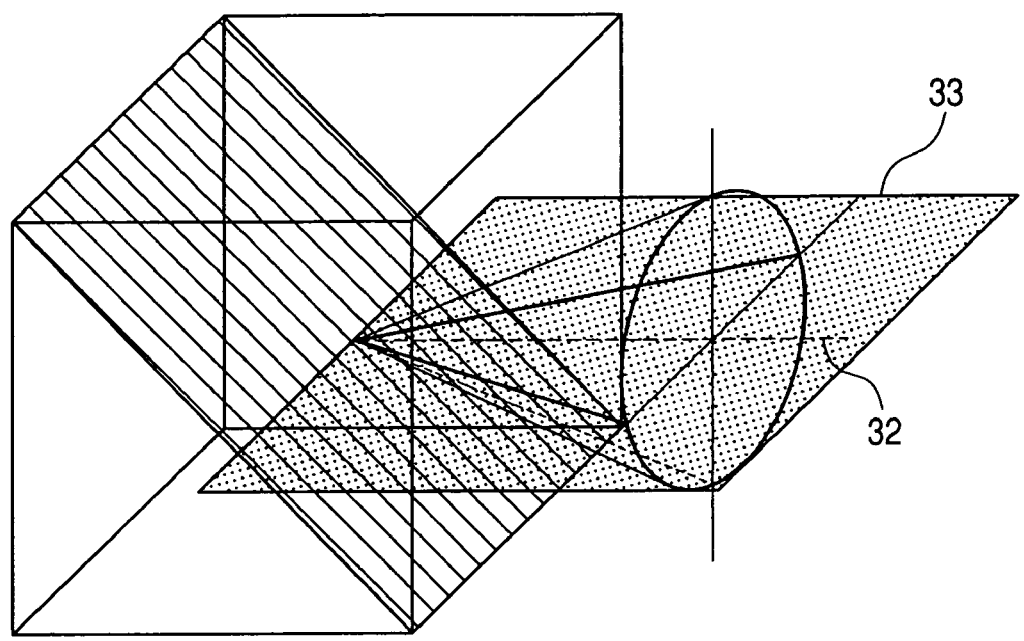
FIG. 21 is a schematic view showing the light flux which is made incident on the optical element according to Embodiment 7 of the present invention.

FIG. 20 shows an incident light beam. As shown in FIG. 20, the incident light beam is made incident on the prism as a convergent light beam 31 (FNo. is about 2.0) having a circular opening about an optical axis 32 formed at 45° relative to the polarization splitting layer. Here, as shown in FIG. 21, when a plane including the periodic direction of the

TABLE 9

| | | Embodiment 7 | | | | | |
|---|---|---|---|---|---|---|---|
| Layer number | Medium | Film thickness [μm] | Grating direction | Pitch p[nm] | F (Filling factor) | Medium width a[nm] | Air thickness b[nm] |
| 1 | $TiO_2$ | 370 | P | 200 | 0.18 | 36 | 164 |
| 2 | $TiO_2$ | 64 | V | 140 | 0.84 | 118 | 22 |
| 3 | $TiO_2$ | 370 | P | 200 | 0.18 | 36 | 164 |

Figure 22:
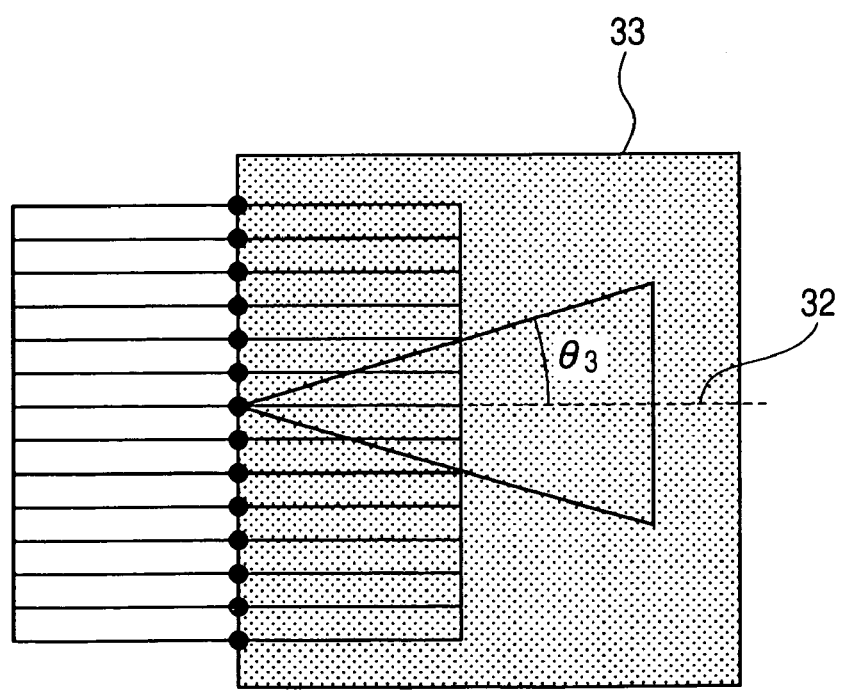
FIG. 22 is a schematic view showing the light flux which is made incident on the optical element according to Embodiment 7 of the present invention.

Prism medium $n_p$ = 1.603 grating in the grating direction P and the optical axis 32 is assumed to be a cross section 33, an angle of the incident light beam within the cross section 33 is shown in FIG. 22 and its width is θ3 about the optical axis.

Figure 23:
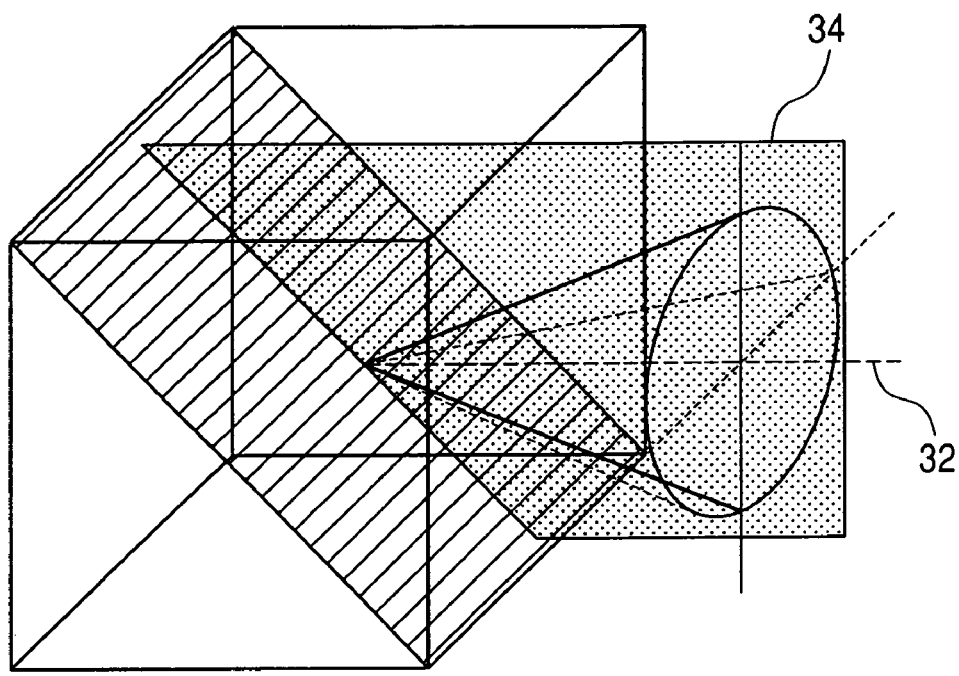
FIG. 23 is a schematic view showing the light flux which is made incident on the optical element according to Embodiment 7 of the present invention.
Figure 24:
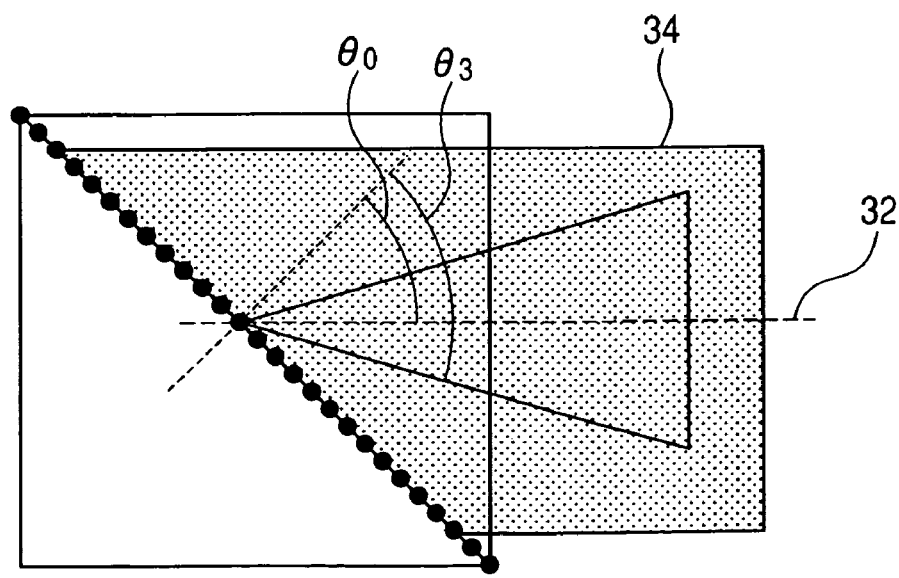
FIG. 24 is a schematic view showing the light flux which is made incident on the optical element according to Embodiment 7 of the present invention.

As shown in FIG. 23, when a plane including the periodic direction of the grating in the grating direction V and the optical axis 32 is assumed to be a cross section 34, an angle of the incident light beam within the cross section 34 is shown in FIG. 24. That is, the optical axis is tilted θ0, so a maximal incident angle of the light beam is θ3.

It is necessary that the incident angle of the light beam within each of the cross sections and the grating pitch should be in a relationship in which diffraction is prevented from occurring. In the cross section shown in FIG. 22, the incident angle θ0 of the light beam on the optical axis relative to the grating is 0°. The maximal incident angle θ3 of the light beam is about 14.5° in the case where FNo. is 2.0.

Here, in the above-mentioned conditional expression (16) related to the diffraction;

$$\sin\theta 1 - \sin\theta 2 = m\lambda/dn \quad (16),$$

the incident angle θ1 of the incident light is within the following range (19) and sin θ1 is within the following range (20).

$$-14.5 \leq \theta 1 \leq 14.5 \quad (19)$$

$$-0.25 \leq \sin\theta 1 \leq 0.25 \quad (20)$$

When θ2 is an arbitrary value, an assumable value for the left side of the expression (17) falls within the following range.

$$-1.25 \leq \sin\theta 1 - \sin\theta 2 \leq 1.25 \quad (21)$$

Therefore, when the following conditional expression (22) is satisfied, solution to the expression (16) is only m=0.

$$1.25 < \lambda/dn \quad (22)$$

That is, when the pitch d of the grating satisfies the following conditional expression (23), the diffraction does not occur.

$$d < \lambda/1.25n \quad (23)$$

When a shortest wavelength λ (=430 nm) of used wavelengths in this embodiment, and a refraction index n (=1.603) of the prism are substituted into the conditional expression (23), the following result is obtained.

$$d < 215[nm] \quad (24)$$

The grating pitch shown in the sectional view of FIG. 22, that is, the grating pitch of the layer L becomes 200 nm which is a value substantially satisfying the above-mentioned condition as shown in Table 9.

In the cross section shown in FIG. 24, the incident angle θ0 of the light beam on the optical axis relative to the grating is 45°, and the maximal incident angle θ3 of the light beam is about 59.5°. When those values are treated in a similar manner as described above, when θ2 is an arbitrary value, an assumable value for the left side of the expression (16) falls within a range of the following expression (25). When the grating pitch d satisfies the following conditional expression (26), the diffraction does not occur.

$$-1.87 \leq \sin\theta 1 - \sin\theta 2 \leq 1.87 \quad (25)$$

$$d < \lambda/1.87n \quad (26)$$

When a shortest wavelength λ (=430 nm) of used wavelengths, and a refraction index n (=1.603) of the prism are substituted into the conditional expression (26), the following result is obtained.

$$d < 143[nm] \quad (27)$$

The grating pitch shown in the sectional view of FIG. 24, that is, the grating pitch of the layer H is 140 nm which is a value substantially satisfying the above-mentioned condition as shown in Table 9.

With respect to the incident angle θ0 of the light beam on the optical axis and the maximal incident angle θ3 of the light beam, a direction in which the incident angles θ0 and θ3 become maximal is in the case where the incident plane is in the direction V. Therefore, when a pitch of each of the gratings 101 and 103 of the layers L is given by $P_B$ and a pitch of the grating 102 of the layer H is given by $P_A$, values satisfying the following conditional expression (28) are set.

$$P_A < P_B \quad (28)$$

As shown in Table 9, the pitch of the grating of the layer L is larger than the pitch of the grating of the layer H. In the grating of the layer L, a medium width rate is small and the layer is thick, so an aspect ratio (ratio of a grating thickness to a grating width) is larger. When the pitch is made larger as much as possible, the aspect ratio is reduced to lower the degree of difficulty in manufacturing.

As described above, the optical element (polarization splitting element) in this embodiment can be defined as follows. The optical element in this embodiment includes a first periodic-structure having a period smaller than the wavelength of used light (in this embodiment, light within the visible light band range of 400 to 700 nm, more preferably, 450 to 650 nm) and a second periodic structure which has a period smaller than the wavelength of the used light and in which the direction of the second periodic structure is perpendicular or substantially perpendicular to the that of the first periodic structure. In this embodiment, the first periodic structure and the second periodic structure are adjacent to each other.

The optical element according to this embodiment is an optical element as described above and has the following features. With respect to a first plane including a periodic direction of the first periodic structure and a normal to the plane of the first periodic structure (either the plane shown in FIG. 22 or the plane shown in FIG. 24) and a second plane including a periodic direction of the second periodic structure and a normal to the plane of the second periodic structure (the other plane, which is not the first plane, of the plane shown in FIG. 22 and the plane shown in FIG. 24), the period of the periodic structure in one of the first and second planes in which a maximal incident angle of a used light beam is larger than that in the other plane is smaller than the period of the other periodic structure in the other plane of the first and second planes.

Further, the feature of the optical element according to this embodiment can be described as follows. With respect to a first plane including a periodic direction of the first periodic structure and a normal to the plane of the first periodic structure (either the plane shown in FIG. 22 or the plane shown in FIG. 24) and a second plane including a periodic direction of the second periodic structure and a normal to the plane of the second periodic structure (the other plane, which is not the first plane, of the plane shown in FIG. 22 and the plane shown in FIG. 24), the period of the periodic structure in one of the first and second planes which is closer to parallel to the used light than the other plane (a plane shown in FIG. 24) is smaller than the period of the other periodic structure in the other plane of the first and second planes.

Furthermore, the feature of the optical element according to this embodiment can also be described as follows. Assuming that a representative light beam be a light beam emitted from the optical element and passing through an optical axis of an optical element in the latter part, with respect to a first plane including a periodic direction of the first periodic structure and a normal to the plane of the first periodic structure (either the plane shown in FIG. 22 or the plane shown in FIG. 24) and a second plane including a periodic direction of the second periodic structure and a normal to the plane of the second periodic structure (the other plane, which is not the first plane, of the plane shown in FIG. 22 and the plane shown in FIG. 24), the period of the periodic structure in one of the first and second planes which is closer to parallel to the representative light beam than the other plane (a plane shown in FIG. 24) is smaller than the period of the other periodic structure in the other plane of the first and second planes.

In this embodiment, the two periodic structures are orthogonal to each other. Of the light incident plane including a periodic direction of one of the periodic structures with respect to the incident light and the light incident plane including a periodic direction of the other of the periodic structures, the period of a periodic structure within an incident plane in which the maximal incident angle of a light beam is larger than the other is made to be smaller than the period of a periodic structure within the other incident plane.

Instead of the maximal incident angle of a light beam, the incident angle of the central light beam (light beam 32 in FIG. 21) may be used. With respect to the incident angle of the central light beam (light beam 32 in FIG. 21), of the light incident plane including the periodic direction of one of the periodic structures and the light incident plane including the periodic direction of the other of the periodic structures, the period of a periodic structure within an incident plane in which the incident angle of the central light beam is larger than the other is to be smaller than the period of a periodic structure within the other incident plane.

When light exited from the optical element according to this embodiment is made incident on another optical system, a light beam passing through the optical axis of the optical system is used as a representative light beam. With respect to the representative light beam, of the light incident plane including the periodic direction of one of the periodic structures and the light incident plane including the periodic direction of the other of the periodic structures, the period of a periodic structure within an incident plane in which the incident angle of the representative light beam is larger than the other may be to be smaller than the period of a periodic structure within the other incident plane.

Figure 25A:
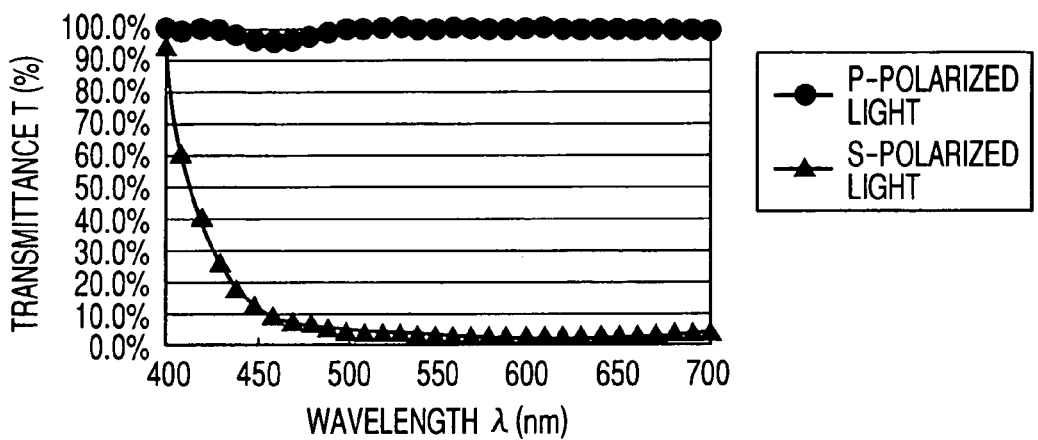
FIGS. 25A, 25B, and 25C are graphs showing transmittance of the optical element according to Embodiment 7 with respect to the P-polarized light and the S-polarized light in the cases where the incident angles are 35°, 45°, and 55° each.
Figure 25B:
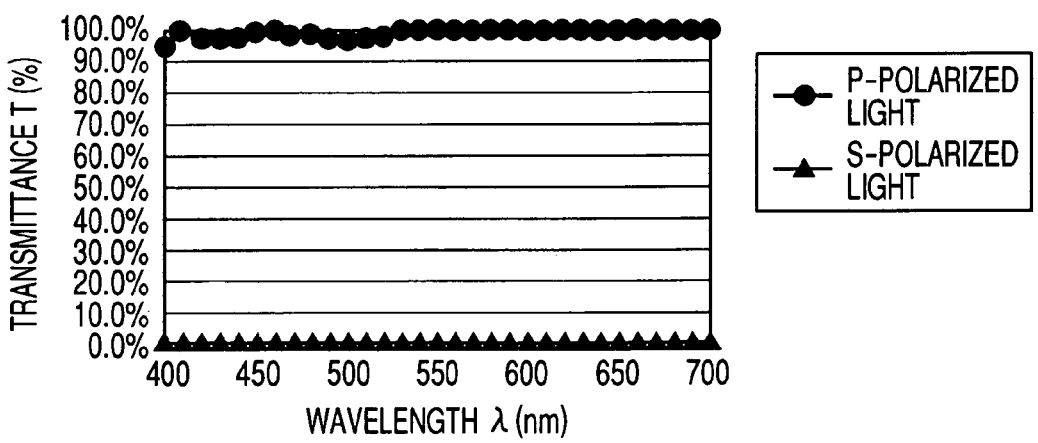
Figure 25C:
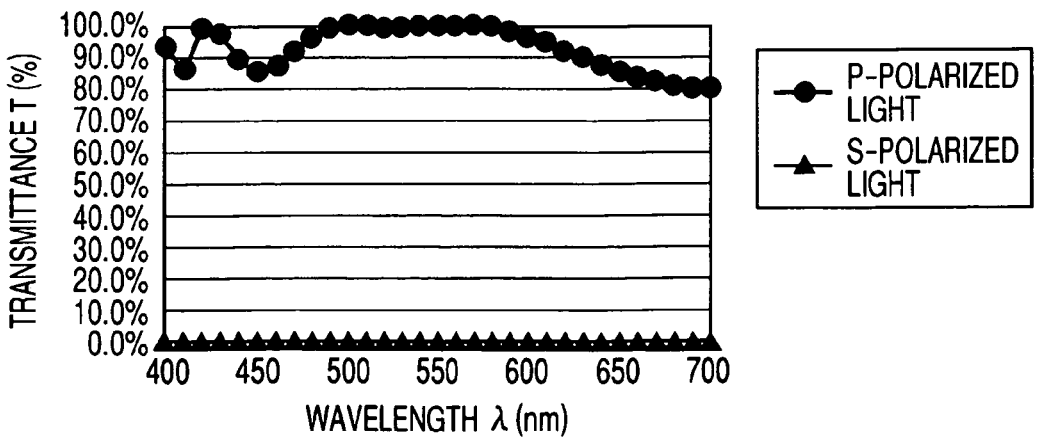

FIGS. 25A, 25B, and 25C show transmittance characteristics obtained by a simulation based on RCWA in Embodiment 7. With respect to the P-polarized light, the transmittance lowers at the high incident angle. However, the lowered transmittance is a level at which substantially no problem is caused in practical use.

With respect to the S-polarized light, the complete reflectance is achieved, because there are little light beams passing through the polarization splitting layer in a very wide incident angle range of 35° to 55° except for that the performance on a short wavelength side deteriorates at a low incident angle.

Subsequently, Embodiment 8 of the present invention will be described. In Embodiment 7, the three one-dimensional gratings corresponding the three layers are stacked. In this embodiment, the five one-dimensional gratings corresponding the five layers are stacked.

Figure 26:
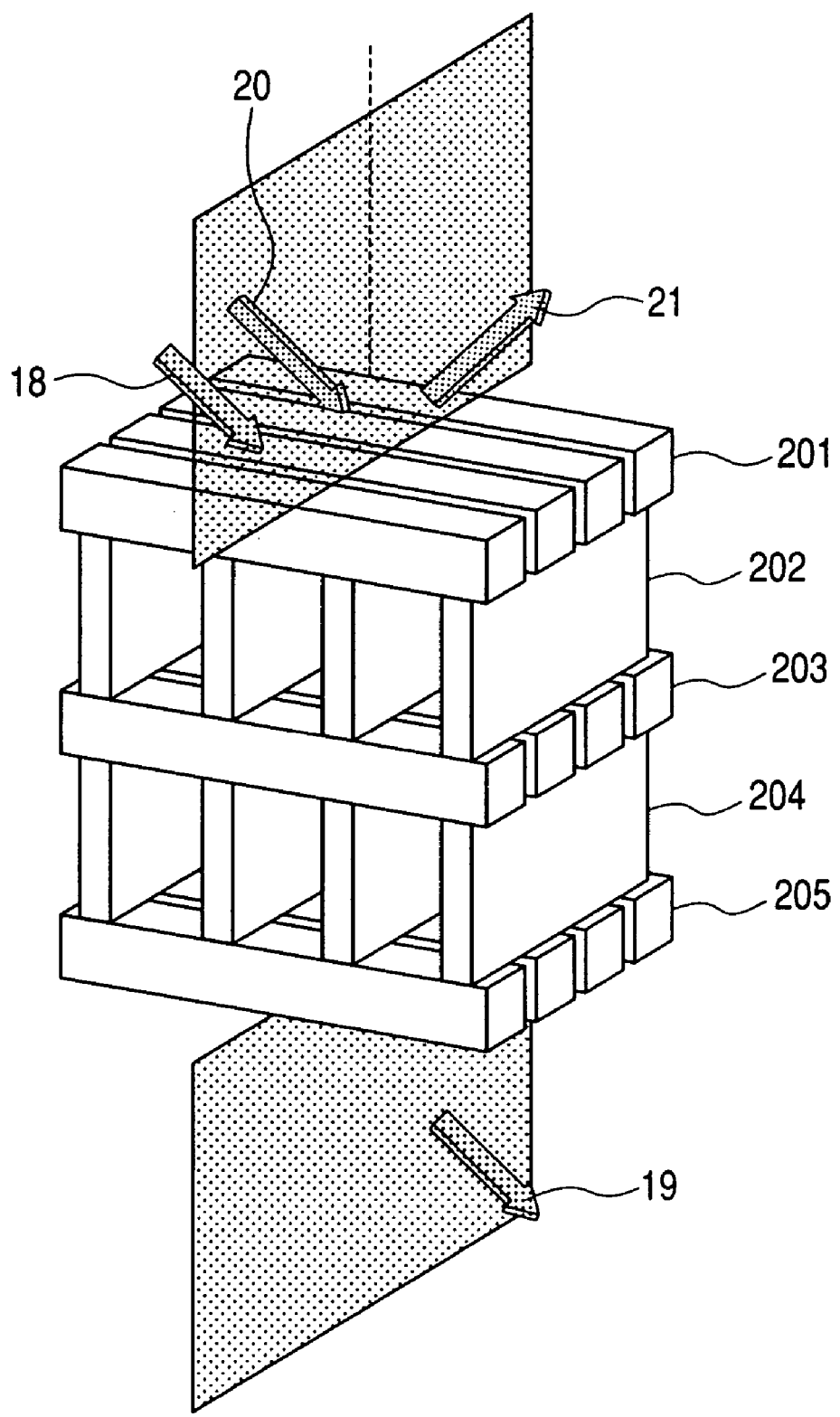
FIG. 26 is a perspective view showing a polarization splitting layer according to Embodiment 8 of the present invention.
Figure 27:
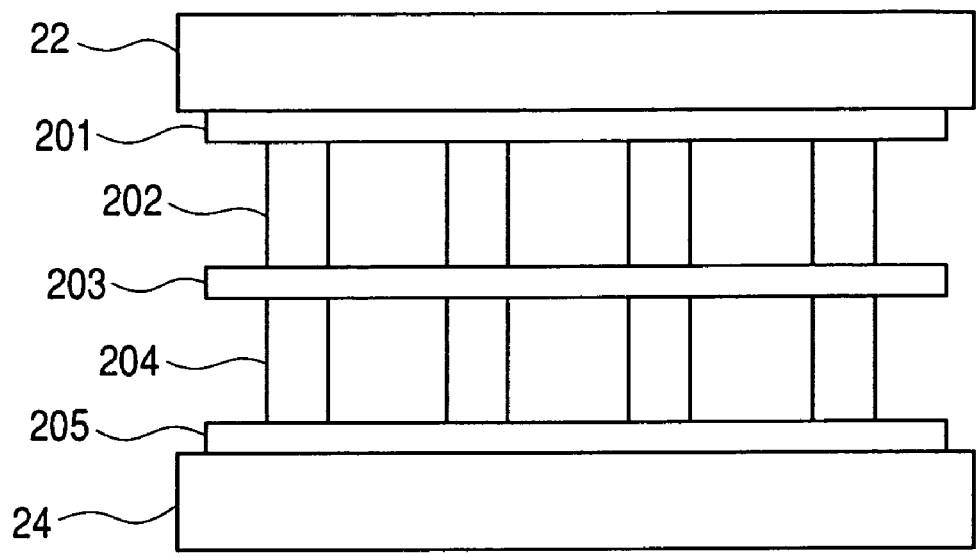
FIG. 27 is a sectional view showing the polarization splitting layer as viewed from the direction A, according to Embodiment 8 of the present invention.
Figure 28:
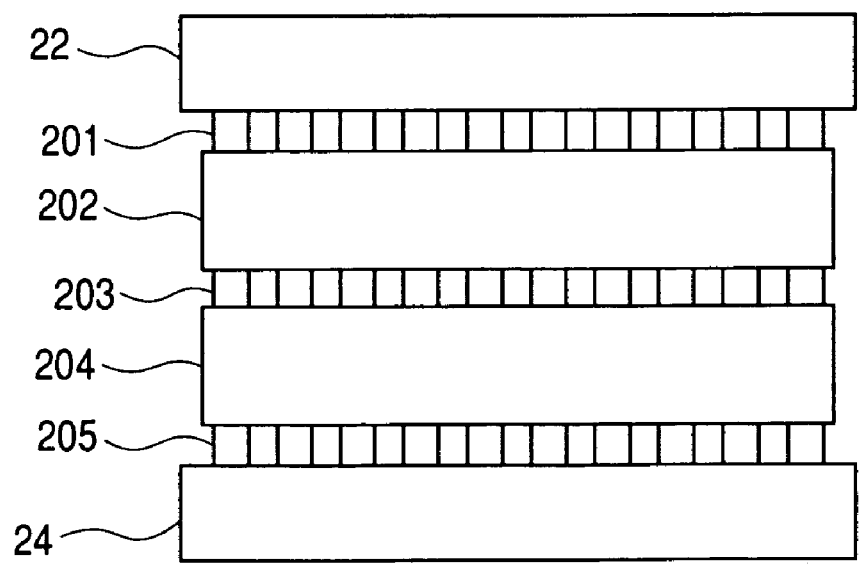
FIG. 28 is a sectional view showing the polarization splitting layer as viewed from the direction B, according to Embodiment 8 of the present invention.

FIG. 26 shows a structure of a polarization splitting layer. FIG. 22 is an oblique perspective view showing gratings. FIGS. 27 and 28 are sectional views showing one-dimensional gratings 201 to 205 of polarization splitting layer as viewed from the directions shown in FIG. 16 as in Embodiment 7.

Each of the one-dimensional gratings 201, 203, and 205 of the layer H in the grating direction V in which air and a dielectric are alternately repeated. Each of the one-dimensional grating 202 and 204 of the layer L in the grating direction P in which the air and the dielectric are alternately repeated.

The polarization splitting is realized using a relatively simple structure having five layers in total. $TiO_2$ is used as the dielectric.

In Embodiment 8, as is apparent from the design values in Table 10, a glass material having a relatively low refractive index of about 1.603 is used for the prism. Each of the layer H corresponding to the one-dimensional grating in the grating direction V and the layer L corresponding to the one-dimensional grating in the grating direction P include $TiO_2$ a dielectric having a high refractive index of 2.282. In order to efficiently produce birefringence, the filling factor of the layer L is set to 0.30 and the filling factor of the layer H is set to 0.90.

TABLE 10

Embodiment 8

| Layer number | Medium | Film thickness [μm] | Grating direction | Pitch p[nm] | f (Filling factor) | Medium width a[nm] | Air width b[nm] |
|---|---|---|---|---|---|---|---|
| 1 | TiO2 | 73 | V | 120 | 0.9 | 270 | 30 |
| 2 | TiO2 | 231 | P | 300 | 0.3 | 90 | 210 |
| 3 | TiO2 | 76 | V | 120 | 0.9 | 270 | 30 |
| 4 | TiO2 | 231 | P | 300 | 0.3 | 90 | 210 |
| 5 | TiO2 | 73 | V | 120 | 0.9 | 270 | 30 |

Prism medium $n_p$ = 1.603

As shown in Table 10, with respect to the P-polarized light, in the case of f=0.30 in the first one-dimensional grating, the effective refractive index in the TE direction is 1.55. In the case of f=0.90 in the second one-dimensional grating, the effective refractive index in the TM direction is 1.98.

On the other hand, as shown in Table 10, with respect to the S-polarized light, in the case of the first one-dimensional grating, the effective refractive index in the TM direction is 1.55. In the case of the second one-dimensional grating, the effective refractive index in the TE direction is 2.21.

Therefore, with respect to the P-polarized light, the effective refractive indices of the first and second one-dimensional gratings are close to each other. With respect to the S-polarized light, the difference between the refractive indices is made large, thereby realizing the transmission and reflection of each of polarized light beams.

With respect to the incident light beam, this embodiment is identical to Embodiment 7.

In FIGS. 22 and 24, it is necessary that the incident angle of the light beam within each of the cross sections 33 and 34 and the grating pitch should be in a relationship in which diffraction is prevented from occurring. Pitch conditions of the respective gratings at this time are expressed by the expressions (24) and (27).

As shown in Table 10, the pitch of the grating of the layer H is 120 nm and satisfies the conditional expression (27). On the other hand, the pitch of the grating of the layer L is 300 nm and does not satisfy the conditional expression (24). However, the pitch of the grating of the layer L widens up to be within the bounds of not causing substantial problem in performance.

With respect to the incident angle $\theta 0$ of the light beam on the optical axis and the maximal incident angle $\theta 3$ of the light beam, a direction in which the incident angles becomes maximal is in the case where the incident plane is in the direction V. Therefore, when a pitch of each of the gratings 202 and 204 of the layers L is given by $P_B$ and a pitch of each of the gratings 201, 203, and 205 of the layers H is given by $P_A$, which satisfy the conditional expression (28).

As shown in Table 10, the pitch of the grating of the layer L is larger than the pitch of the grating of the layer H. In the grating of the layer L, the medium width is small relative to that of air and the layer is thick, so the aspect ratio (ratio of the grating thickness to the grating width) is large. When the pitch is made larger as much as possible, the aspect ratio is reduced to lower the degree of difficulty in manufacturing.

Figure 29A:
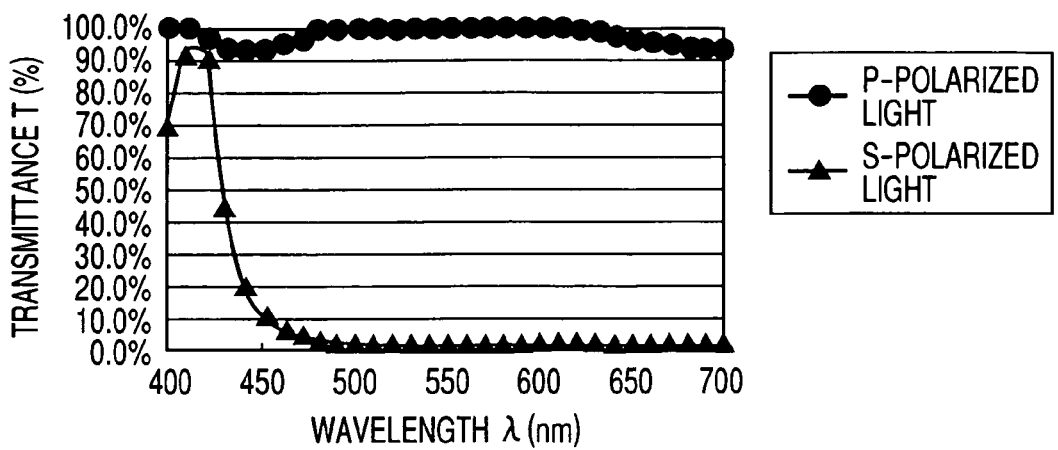
FIGS. 29A, 29B, and 29C are graphs showing transmittance of an optical element according to Embodiment 8 with respect to the P-polarized light and the S-polarized light in the cases where the incident angles are 35°, 45°, and 55° each.
Figure 29B:
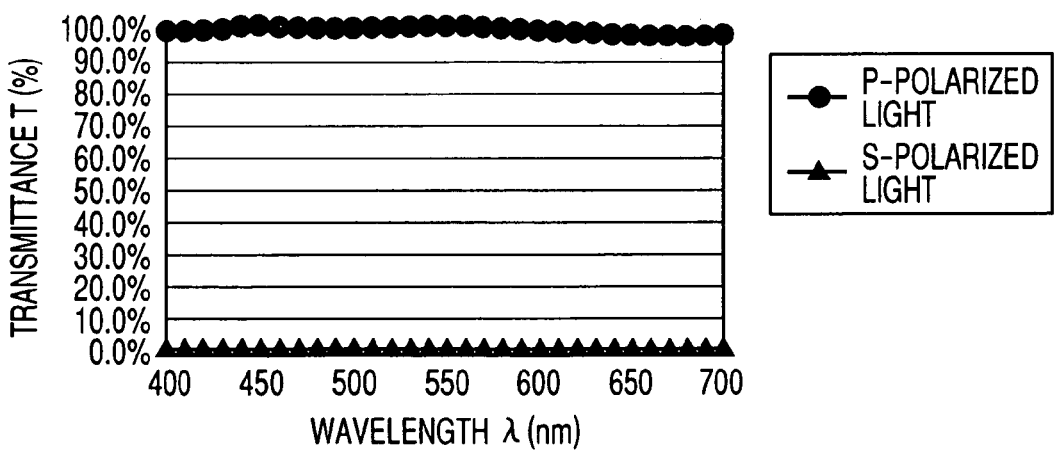
Figure 29C:
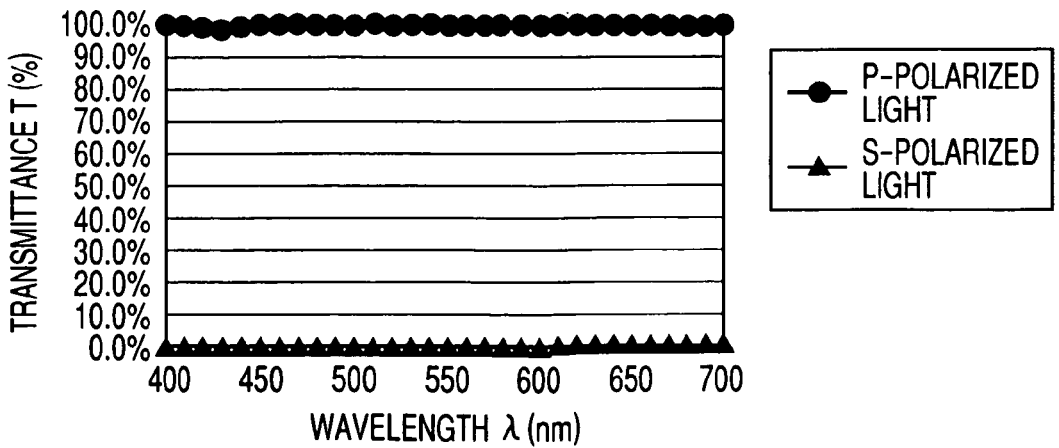

FIGS. 29A, 29B, and 29C show transmittance characteristics obtained by a simulation based on RCWA in Embodiment 8. With respect to the P-polarized light, the transmittance slightly lowers at the low incident angle. However, substantially-preferable performance is achieved at angles other than the low incident angle.

With respect to the S-polarized light, the complete reflectance is achieved, because there are little light beams passing through the polarization splitting layer in a very wide incident angle range of 35° to 55° except for that the performance on a short wavelength side deteriorates at the low incident angle.

Subsequently, Embodiment 9 of the present invention will be described. The incident angle of the incident light in Embodiment 9 is different from those in Embodiments 7 and 8.

Figure 30:
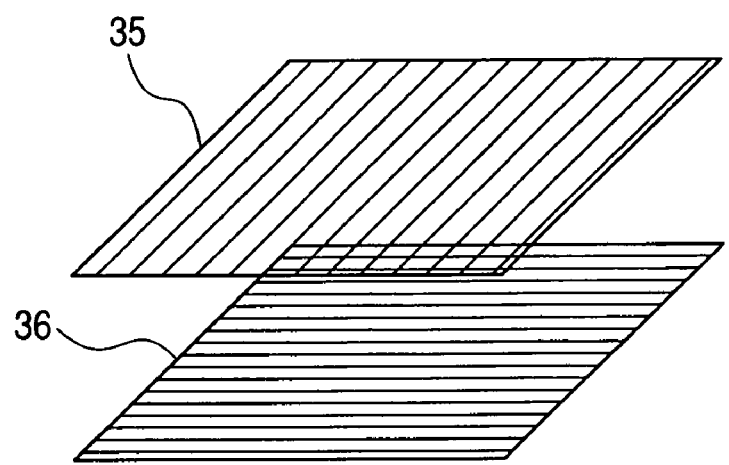
FIG. 30 is a structural view showing a phase element according to Embodiment 9 of the present invention.
Figure 31:
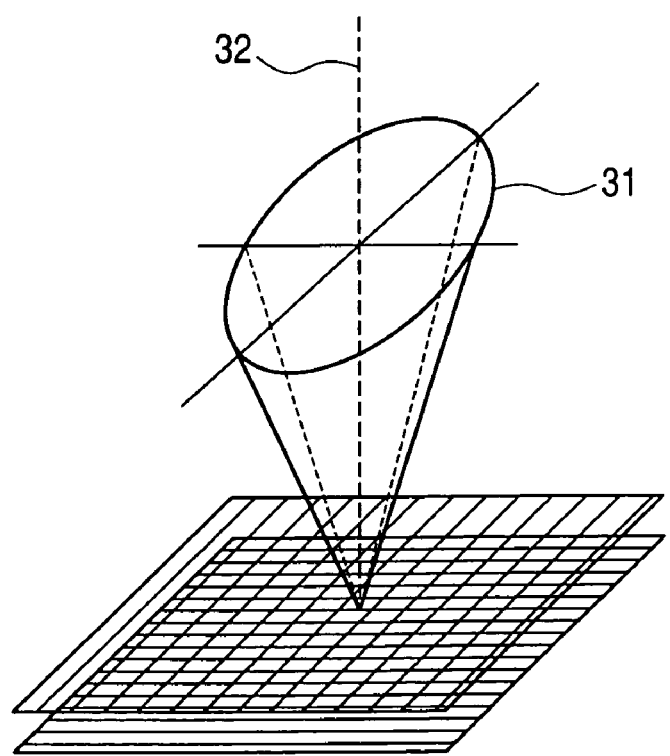
FIG. 31 is a schematic view showing a light flux which is made incident on the phase element according to Embodiment 9 of the present invention.
Figure 32:
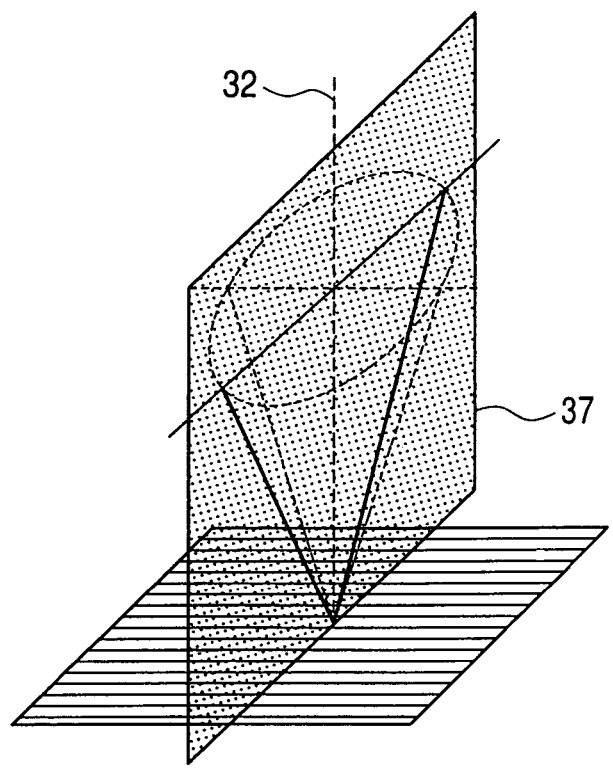
FIG. 32 is a schematic view showing a light flux which is made incident on the phase element according to Embodiment 9 of the present invention.
Figure 33:
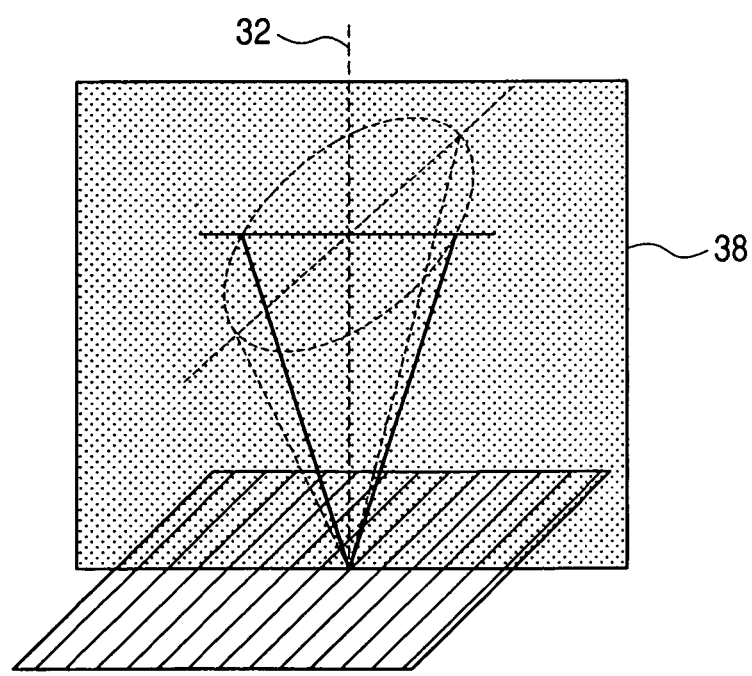
FIG. 33 is a schematic view showing a light flux which is made incident on the phase element according to Embodiment 9 of the present invention.
Figure 34:
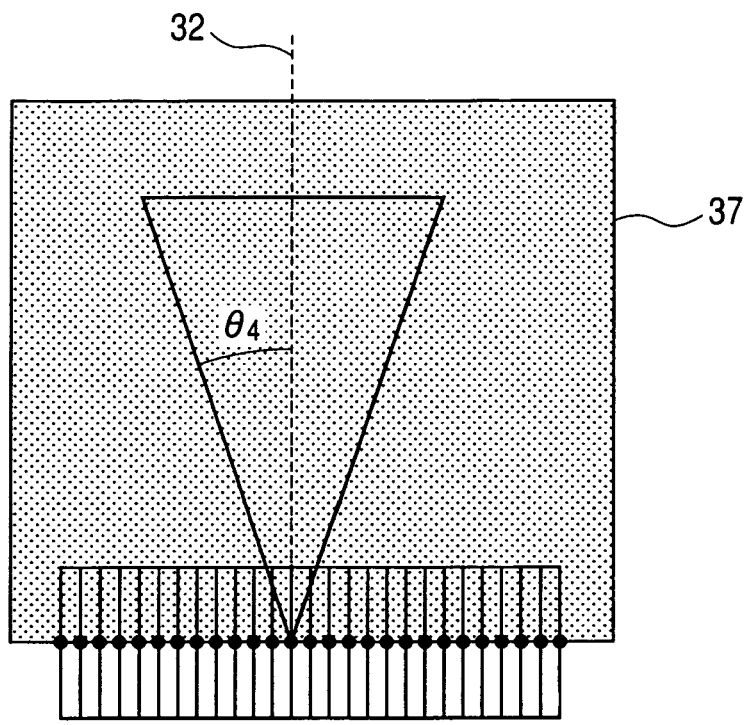
FIG. 34 is a schematic view showing a light flux which is made incident on the phase element according to Embodiment 9 of the present invention.

FIG. 30 shows a polarization splitting layer in Embodiment 9. An optical device according to Embodiment 9 is a device, such as a phase plate, used for a structure on which light is incident at an incident angle of 0°. As shown in FIG. 30, one-dimensional gratings 35 and 36 are stacked such that they are orthogonal to each other. FIG. 31 shows the incident light beam in Embodiment 9. As shown in FIG. 31, the light beam on the optical axis 32 is made incident on the polarization splitting layer at the incident angle of 0° and has an elliptical opening about the optical axis 32. A light beam on a sectional view 37 including the major axis of the elliptical opening as shown in FIG. 32 is a light beam as shown in FIG. 34. In addition, a light beam on a sectional view 38 including the minor axis of the elliptical opening as shown in FIG. 33 is a light beam as shown in FIG. 35.

The incident light beam on the cross section 37 shown in FIG. 34 has an opening with FNo.=2.0 and $\theta 4$ is 14.52°. Therefore, as in Embodiment 7, it is necessary that the grating pitch in the cross sectional direction satisfy the expression (24).

$$d<215[nm] \quad (24)$$

Figure 35:
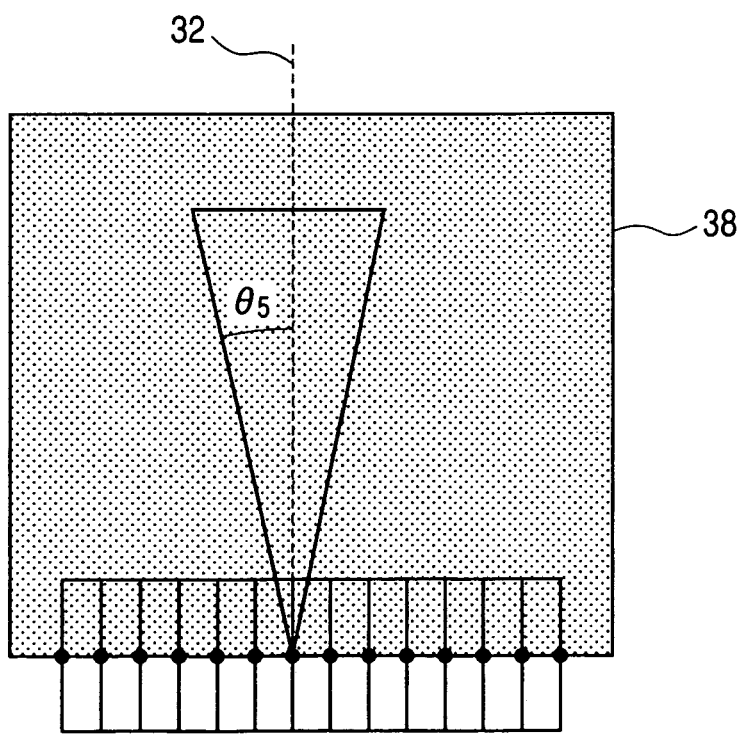
FIG. 35 is a schematic view showing alight flux which is made incident on the phase element according to Embodiment 9 of the present invention.
Figure 36:
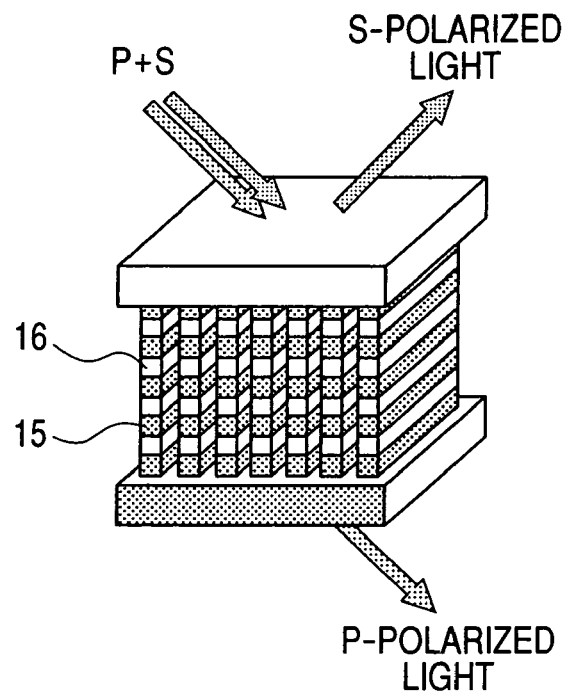
FIG. 36 is a schematic view showing a polarization splitting element of conventional multi-layer film etching type.
Figure 37:
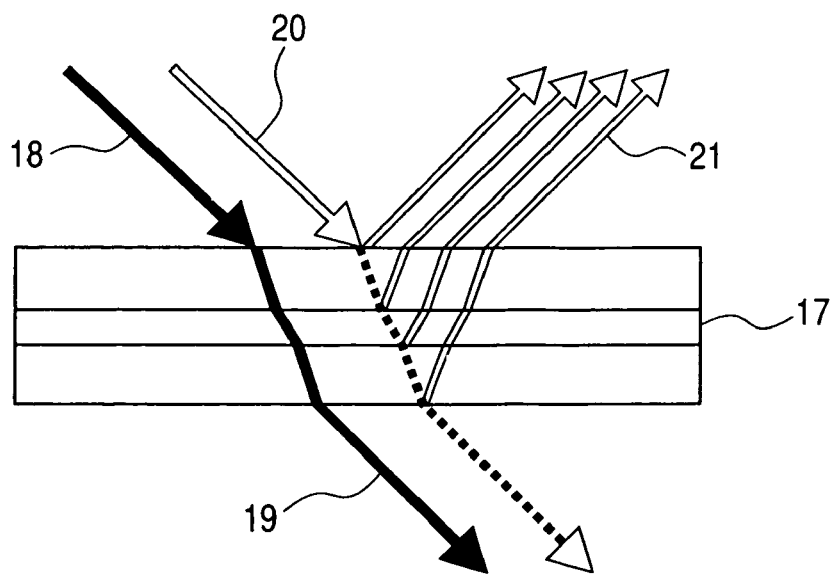
FIG. 37 is a schematic view showing a conventional multi-layer film polarization splitting element.

On the other hand, the incident light beam on the cross section 38 shown in FIG. 35 has an opening with FNo.=4.0 and $\theta 5$ is 7.2. The grating pitch in the cross sectional direction is expressed by the expression (29) based on the same calculation.

$$d<238[nm] \quad (29)$$

The pitches of the respective gratings satisfy the conditional expressions (24) and (29), so the diffraction does not occur.

In Embodiment 9, the light beam in which the cross section 37 shown in FIG. 34 is the incident plane has the maximal incident angle. Therefore, a grating pitch shown in FIG. 34 is $P_A$ and a grating pitch orthogonal to the grating pitch is $P_B$. As shown in Table 11, values of those grating pitches satisfies the conditional expression (28).

Table 11 shows values of $P_A$ and $P_B$ in each of Embodiments 7 to 9.

TABLE 11

$P_A$, $P_B$ in Embodiments 7–9

|  | $P_A$ | $P_B$ |
|---|---|---|
| Embodiment 7 | 140 | 200 |
| Embodiment 8 | 120 | 300 |
| Embodiment 9 | 200 | 230 |

Finally, Embodiment 10 of the present invention will be described. Embodiment 10 shows an optical device using the optical element (polarization splitting element) according to any one of Embodiments 1 to 9. Here, the optical device is a reflection liquid crystal projector.

Figure 9:
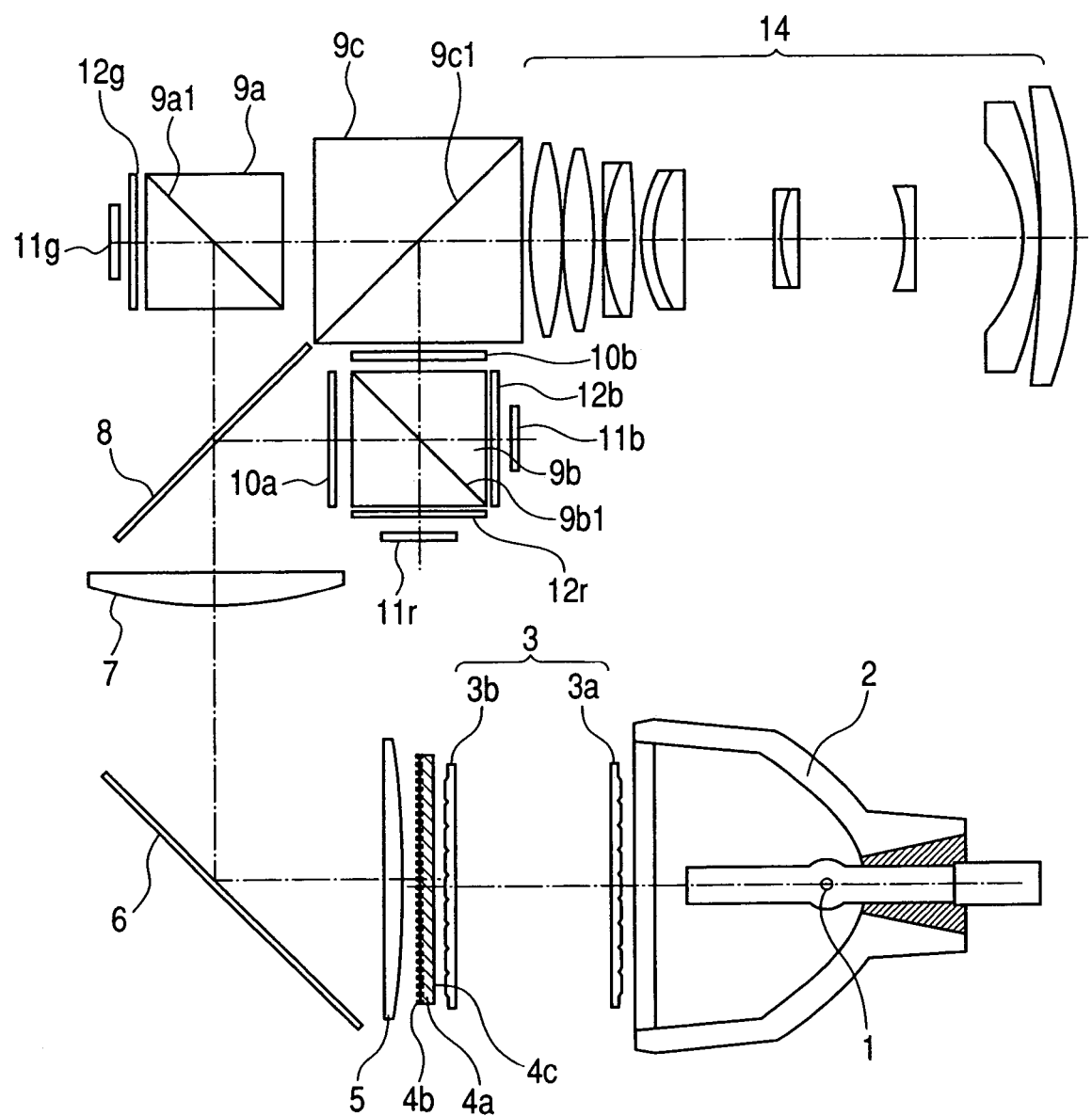
FIG. 9 is a structural view showing a reflection liquid crystal projector optical system in which a polarization splitting layer according to Embodiment 7 of the present invention is incorporated.

FIG. 9 is a schematic structural view showing the optical device according to Embodiment 10 and shows a reflection image modulating device using the polarization splitting element according to any one of Embodiments 1 to 9. In FIG. 9, the reflection image modulating device includes a light source 1 composed of a high-pressure mercury lamp or the like, a reflector 2 for radiating light from the light source 1 in a predetermined direction, and an integrator 3 for forming an illumination region having substantially uniform illumination intensity. The integrator 3 is composed of fly eye lenses 3a and 3b, which can be replaced with a configuration including a plurality of cylindrical lens arrays. The reflection image modulating device further includes a polarization converting element 4 for adjusting no-polarized light in a predetermined polarization direction, a condenser lens 5 for condensing illumination light, a mirror 6, a field lens 7 for converting the illumination light into telecentric light, and a dichroic mirror 8 for transmitting light having a wavelength in green wavelength region. The reflection image modulating device further includes polarization splitting elements 9a1, 9b1, and 9c1 according to any one of Embodiments 1 to 9, each of which has a characteristic in which the S-polarized light is reflected and the P-polarized light is transmitted, and polarization splitting prisms 9a, 9b, and 9c each having the polarization splitting elements 9a1, 9b1, and 9c1. The reflection image modulating device further-includes color selecting-phase difference plates 10a and 10b for changing (rotating) polarization directions of light beams having predetermined wavelength regions by 90°, reflection liquid crystal display elements 11r, 11g, and 11b for reflecting respective incident illumination light beams and modulating the light beams based on image signals to produce image light beams, ¼ phase difference plates 12r, 12g, and 12b, and a projection lens system (projecting optical system) 14 for projecting light emitted from ¼ phase difference plates onto a predetermined plane (for example screen). When the polarization splitting elements according to any one of Embodiments 1 to 9 are disposed as described above, an incident angle characteristic and a wavelength-characteristic are made superior. As a result, a reflection liquid crystal projector in which contrast obtained by the entire optical system is very high can be realized.

This application claims priority from Japanese Patent Application No. 2004-139054 filed on May 7, 2004 and Japanese Patent Application No. 2004-149224 filed on May 19, 2004, which are hereby incorporated by reference herein.

What is claimed is:

1. An optical element, comprising:
a first periodic structure having a period shorter than a wavelength of used light; and
a second periodic structure that has a period shorter than the wavelength of the used light and in which a direction of the period is orthogonal to or substantially orthogonal to that of the first periodic structure, the second periodic structure being adjacent to the first periodic structure,
wherein the period of the first periodic structure and the period of the second structure are different from each other,
wherein with respect to a first plane including a periodic direction of the first periodic structure and a normal to a plane of the first periodic structure and a second plane including a periodic direction of the second periodic structure and a normal to a plane of the second periodic structure, the period of the periodic structure in one of the first and second planes in which a maximal incident angle of a used light beam is larger than that in the other plane is smaller than the period of the other periodic structure in the other plane of the first and second planes.

2. An optical element according to claim 1, wherein with respect to a first plane including a periodic direction of the first periodic structure and a normal to a plane of the first periodic structure and a second plane including a periodic direction of the second periodic structure and a normal to a plane of the second periodic structure, the period of the periodic structure in one of the first and second planes which is closer to parallel to the used light than the other plane is smaller than the period of the other periodic structure in the other plane of the first and second planes.

3. An optical element according to claim 1, wherein with defining a representative light beam as a light beam which is emitted from the optical element and passes through an optical axis of the optical system, with respect to a first plane including a periodic direction of the first periodic structure and a normal to a plane of the first periodic structure and a second plane including a periodic direction of the second periodic structure in the optical element and a normal to a plane of the first periodic structure, the period of the periodic structure in one of the first and second planes which is closer to parallel to the representative light beam than the other plane is smaller than the period of the other periodic structure in the other plane of the first and second planes.

4. An optical device, comprising:
an optical element according to claim 1;
modulation means for modulating light emitted from the optical element based on an image signal; and
a projection optical system for projecting the light modulated by the modulation means to a predetermined plane.

5. An optical element, comprising:
a first periodic structure having a period shorter than a wavelength of used light; and
a second periodic structure that has a period shorter than the wavelength of the used light and in which a direction of the period is orthogonal to or substantially orthogonal to that of the first periodic structure, the second periodic structure being adjacent to the first periodic structure,
wherein the period of the first periodic structure and the period of the second structure are different from each other,
wherein with respect to a first plane including a periodic direction of the first periodic structure and a normal to a plane of the first periodic structure and a second plane including a periodic direction of the second periodic structure and a normal to a plane of the second periodic structure, the period of the periodic structure in one of the first and second planes which is closer to parallel to the used light than the other plane is smaller than the period of the other periodic structure in the other plane of the first and second planes.

6. An optical device, comprising:
an optical element according to claim 5;
modulation means for modulating light emitted from the optical element based on an image signal; and
a projection optical system for projecting the light modulated by the modulation means to a predetermined plane.

7. An optical element, comprising:
a first periodic structure having a period shorter than a wavelength of used light; and
a second periodic structure that has a period shorter than the wavelength of the used light and in which a direction of the period is orthogonal to or substantially orthogonal to that of the first periodic structure, the second periodic structure being adjacent to the first periodic structure,
wherein the period of the first periodic structure and the period of the second structure are different from each other,
wherein with defining a representative light beam as a light beam which is emitted from the optical element and passes through an optical axis of the optical system, with respect to a first plane including a periodic direction of the first periodic structure and a normal to a plane of the first periodic structure and a second plane including a periodic direction of the second periodic structure in the optical element and a normal to a plane of the first periodic structure, the period of the periodic structure in one of the first and second planes which is closer to parallel to the representative light beam than the other plane is smaller than the period of the other periodic structure in the other plane of the first and second planes.

8. An optical device, comprising:
an optical element according to claim 7;
modulation means for modulating light emitted from the optical element based on an image signal; and
a projection optical system for projecting the light modulated by the modulation means to a predetermined plane.

* * * * *